United States Patent
Liu et al.

(10) Patent No.: US 12,426,069 B2
(45) Date of Patent: Sep. 23, 2025

(54) INTERLACED SIDELINK DATA FOR COMMUNICATION

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US); Yisheng Xue, San Diego, CA (US); Changlong Xu, Beijing (CN); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/921,061

(22) PCT Filed: Apr. 30, 2020

(86) PCT No.: PCT/CN2020/088111
§ 371 (c)(1),
(2) Date: Oct. 24, 2022

(87) PCT Pub. No.: WO2021/217562
PCT Pub. Date: Nov. 4, 2021

(65) Prior Publication Data
US 2023/0164815 A1     May 25, 2023

(51) Int. Cl.
*H04W 72/04*     (2023.01)
*H04L 5/00*      (2006.01)
*H04W 72/40*     (2023.01)

(52) U.S. Cl.
CPC .......... *H04W 72/40* (2023.01); *H04L 5/0053* (2013.01)

(58) Field of Classification Search
CPC ... H04L 5/0016; H04L 5/0023; H04L 5/0044; H04L 5/0048; H04L 5/0051;
(Continued)

(56) References Cited

U.S. PATENT DOCUMENTS 11,438,118 B2 *  9/2022  Baldemair ........ H04W 72/0453
11,502,796 B2 * 11/2022  Werner .................. H04L 5/0053
(Continued)

FOREIGN PATENT DOCUMENTS

CN   106797635 A    5/2017
CN   110535611 A   12/2019
(Continued)

OTHER PUBLICATIONS

International Search Report and Written Opinion—PCT/CN2020/088111—ISA/EPO—Jan. 27, 2021.
(Continued)

*Primary Examiner* — Frank Duong
(74) *Attorney, Agent, or Firm* — Loza & Loza, LLP

(57) ABSTRACT

Aspects of the disclosure relate to a user equipment (UE) for establishing a sidelink communication channel and receive mapped channel state information-reference signals (CSI-RS) over a plurality of PSSCH resource blocks. The mapped CSI-RS may be interlaced with resource elements in at least a portion of the plurality of PSSCH resource blocks. The CSI-RS received over the plurality of PSSCH blocks is then processed to determine a channel quality of the sidelink channel from the portion of the plurality of PSSCH resource blocks including the mapped CSI-RS.

32 Claims, 26 Drawing Sheets

(58) Field of Classification Search
CPC .. H04L 5/0053; H04W 72/044; H04W 72/23; H04W 72/40; H04W 76/14
See application file for complete search history.

(56) References Cited

U.S. PATENT DOCUMENTS

| | | | |
|---|---|---|---|
| 2017/0288837 A1 | 10/2017 | Namgoong et al. | |
| 2020/0351033 A1* | 11/2020 | Ryu | H04L 1/1861 |
| 2021/0391951 A1* | 12/2021 | Lee | H04W 4/08 |
| 2022/0132516 A1* | 4/2022 | Hwang | H04W 72/563 |
| 2022/0174655 A1* | 6/2022 | Tsai | H04W 72/20 |
| 2022/0201528 A1* | 6/2022 | Shin | H04W 92/18 |
| 2022/0272717 A1* | 8/2022 | Chen | H04L 5/0094 |
| 2022/0394722 A1* | 12/2022 | Hwang | H04W 72/542 |
| 2023/0361830 A1 | 11/2023 | Liu et al. | |

FOREIGN PATENT DOCUMENTS

| | | |
|---|---|---|
| CN | 110603777 A | 12/2019 |
| CN | 110999165 A | 4/2020 |
| WO | 2018174543 A1 | 9/2018 |
| WO | 2018204931 A1 | 11/2018 |
| WO | 2020056068 A1 | 3/2020 |

OTHER PUBLICATIONS

Nokia, et al., "Discussion of Physical Layer Procedures for Sidelink", 3GPP TSG-RAN WG1 Meeting #97, R1-1906079 Reno, USA, May 13-17, 2019, Sections 1-3.

Huawei, et al., "Sidelink CSI", 3GPP TSG RAN WG1 Meeting #98, R1-1909438, 3rd Generation Partnership Project, Mobile Competence Centre, 650, Route Des Lucioles, F-06921 Sophia-Antipolis Cedex, France, vol. RAN WG1, no. Prague, Czech Republic, Aug. 26, 2019-Aug. 30, 2019, Aug. 17, 2019, 9 Pages, XP051766045, sections 1-4, figure 3.

Huawei, et al., "Sidelink Reference Signal Design for NR V2X", 3GPP TSG RAN WG1 Meeting #97, R1-1906009, Reno, USA, May 13-17, 2019, 3rd Generation Partnership Project (3GPP), Mobile Competence Centre, 650 Route Des Lucioles, F-06921, Sophia-Antipolois Cedex France, vol. RAN WG1 no. Reno, USA, May 13, 2019-May 17, 2019, May 13, 2019, XP051727466, 11 Pages, Section 2.1, sections 1-5, figures 8-9.

Nokia, et al., "Discussion of Physical Layer Structure for Sidelink", 3GPP TSG RAN WG1 #98bis, R1-1910512-NOKIA-5G V2X NRSL— Discussion of Physical Layer Structure for Sidelink, 3rd Generation Partnership Project, Mobile Competence Centre, 650, Route Des Lucioles, F-06921, Sophia-Antipolis Cedex, France, vol. RAN WG1. No. Chongqing, China, Oct. 14, 2019-Oct. 20, 2019, Oct. 8, 2019, XP051809140, 16 Pages, p. 4 p. 5-p. 6, table 1, paragraph [02.2], sections 1-3, figure 2.

Supplementary European Search Report—EP20933850—Search Authority—The Hague—Nov. 27, 2023.

* cited by examiner

INTERLACED SIDELINK DATA FOR COMMUNICATION

CROSS-REFERENCE TO RELATED APPLICATION(S)

This application is the U.S. national stage of PCT patent application number filed on Apr. 30, 2020.

TECHNICAL FIELD

The technology discussed below relates generally to wireless communication systems, and more particularly, to wireless sidelink communication.

BACKGROUND

3rd Generation Partnership Project (3GPP) New Radio (NR) supports operation in unlicensed spectrum, intelligent transportation systems, Industrial Internet of Things, non-terrestrial networks, and vehicle-to-everything (V2X) application layer services, among other services and features. NR-based V2X builds on previous iterations of Long-Term Evolution (LTE)-V2X, and provides advanced features, primarily in the area of low latency use cases. Enhanced NR system and new NR sidelinks have been introduced for V2X to meet certain requirements, such as a need to have a flexible design to support services with low latency and high reliability requirements, along with support for higher capacity and better coverage.

As the demand for mobile broadband access and sidelink communications continues to increase, research and development continue to advance wireless communication technologies not only to meet the growing demand for mobile broadband access, but to advance and enhance mobile communications. Accordingly, the present disclosure addresses technologies and techniques to improve sidelink communications.

BRIEF SUMMARY

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method is disclosed for wireless communication at a user equipment (UE), comprising establishing communication over a sidelink channel, and receiving mapped channel state information-reference signals (CSI-RS) over a plurality of PSSCH resource blocks, wherein the mapped CSI-RS are interlaced with resource elements in at least a portion of the plurality of PSSCH resource blocks. The method further comprises processing the CSI-RS received over the plurality of PSSCH resource blocks, and determining from the processing a channel quality of the sidelink channel from the portion of the plurality of PSSCH resource blocks comprising the mapped CSI-RS.

In another example, a user equipment (UE) for wireless communication is disclosed, comprising a transceiver, at least one processor, and a memory coupled to the at least one processor, the at least one processor and the memory configured to establish communication over a sidelink channel, and receive mapped channel state information-reference signals (CSI-RS) over a plurality of PSSCH resource blocks, wherein the mapped CSI-RS are interlaced with resource elements in at least a portion of the plurality of PSSCH resource blocks. The UE processor and memory may be further configured to process the CSI-RS received over the plurality of PSSCH blocks, and determine from the processing a channel quality of the sidelink channel from the portion of the plurality of PSSCH resource blocks comprising the mapped CSI-RS.

In another example, a non-transitory computer-readable medium is disclosed, storing computer-executable code at a user equipment (UE), comprising code for causing a computer to establish communication over a sidelink channel, and receive mapped channel state information-reference signals (CSI-RS) over a plurality of PSSCH resource blocks, wherein the mapped CSI-RS are interlaced with resource elements in at least a portion of the plurality of PSSCH resource blocks. The non-transitory computer medium is further configured to process the CSI-RS received over the plurality of PSSCH blocks, and determine from the processing a channel quality of the sidelink channel from the portion of the plurality of PSSCH resource blocks comprising the mapped CSI-RS.

In another example, a user equipment (UE) is disclosed for wireless communication, comprising means for establishing communication over a sidelink channel, and means for receiving mapped channel state information-reference signals (CSI-RS) over a plurality of PSSCH resource blocks, wherein the mapped CSI-RS are interlaced with resource elements in at least a portion of the plurality of PSSCH resource blocks. The UE may further comprise means for processing the CSI-RS received over the plurality of PSSCH blocks, and means for determining from the processing a channel quality of the sidelink channel from the portion of the plurality of PSSCH resource blocks comprising the mapped CSI-RS.

These and other aspects of the disclosure will become more fully understood upon a review of the detailed description, which follows. Other aspects and features will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as a device, system, or method, it should be understood that such exemplary aspects can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects are described in this application by illustration to some examples, those skilled in the art will understand that additional implementations and use cases may come about in many different arrangements and scenarios. Aspects described herein may be implemented across many differing platform types, devices, systems, shapes, sizes, packaging arrangements. For example, aspects and/or uses may come about via integrated chip aspects and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or OEM devices or systems incorporating one or more aspects of the disclosure. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes and constitution.

Figure 1:
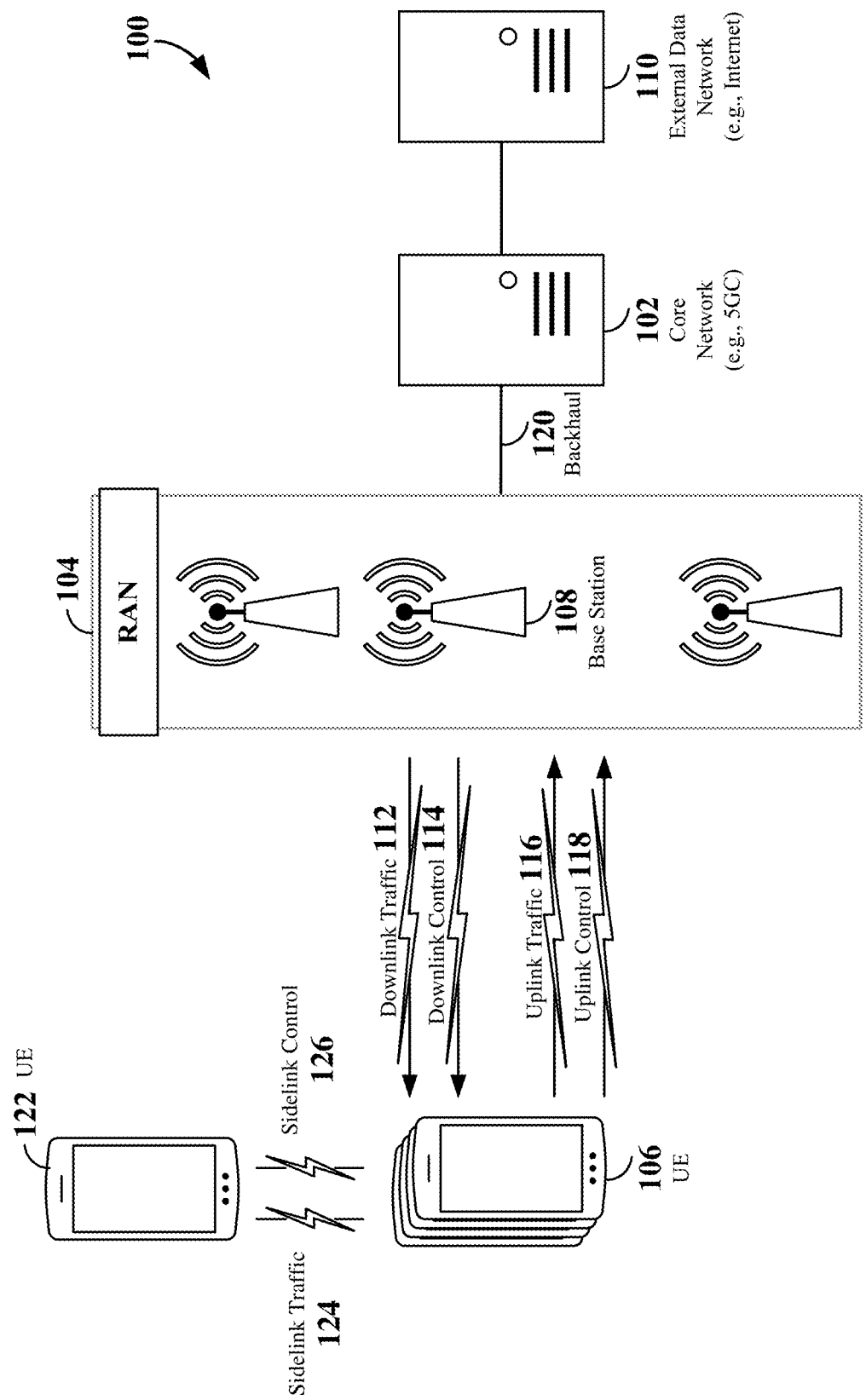
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the base station/scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a base station 108 may broadcast downlink traffic 112 to one or more UEs 106. Broadly, the base station 108 is a node or device responsible for scheduling traffic in a wireless communication network, including the downlink traffic 112 and, in some examples, uplink traffic 116 from one or more UEs 106 to the base station 108. On the other hand, the UE 106 is a node or device that receives downlink control information 114, including but not limited to scheduling information (e.g., a grant), synchronization or timing information, or other control information from another entity in the wireless communication network such as the base station 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
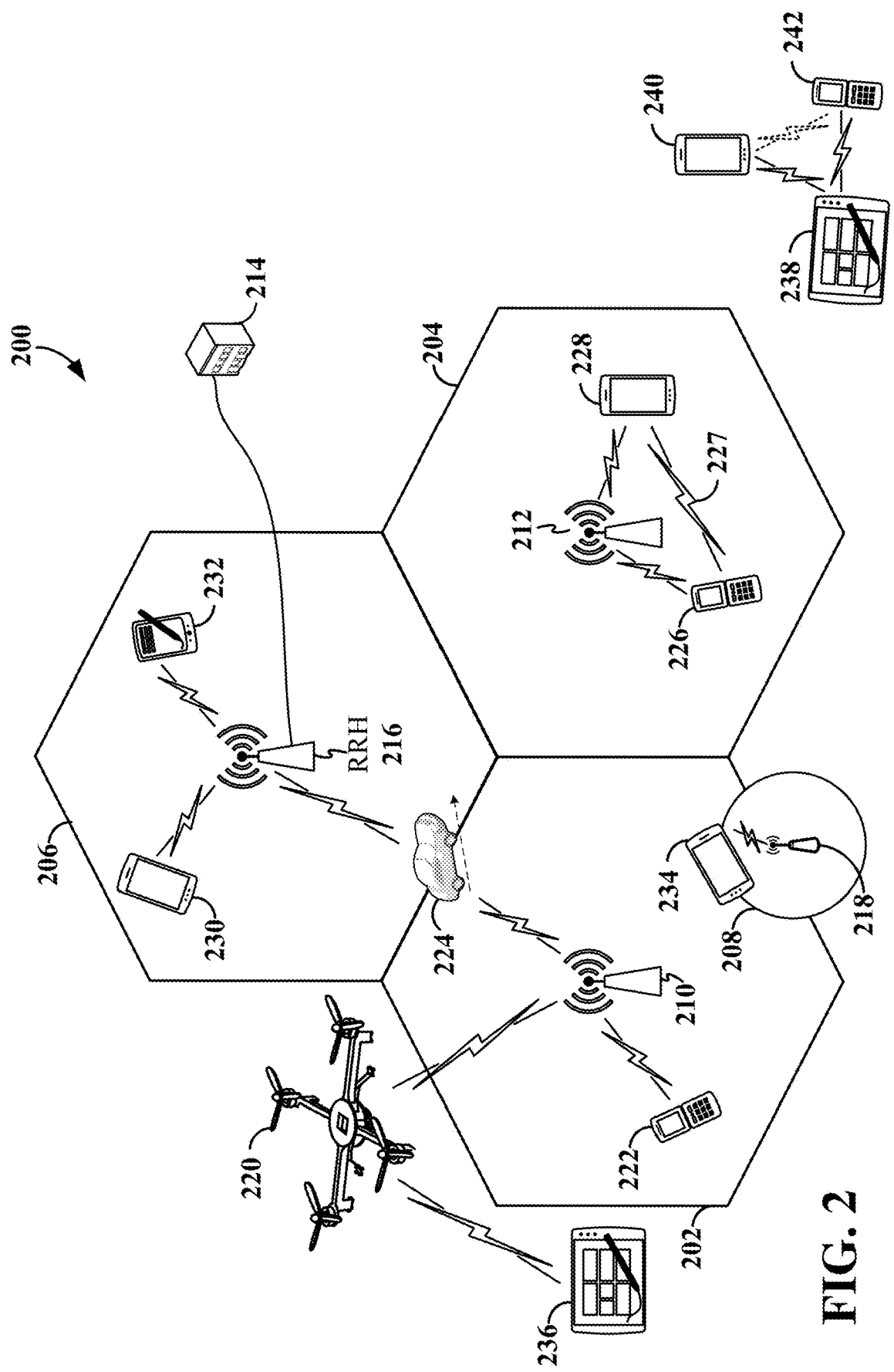
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown).

A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations (e.g., scheduling entities) 108 and UEs (e.g., scheduled entities) 106 may include suitable hardware and capabilities (e.g., an encoder, a decoder, and/or a CODEC) to utilize one or more of these channel codes for wireless communication.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In some examples, access to the air interface may be scheduled, where a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, UE 238 is illustrated communicating with UEs 240 and 242. In some examples, the UE 238 is functioning as a scheduling entity, while the UEs 240 and 242 may function as scheduled entities. In other examples, sidelink or other type of direct link signals may be communicated directly between UEs without necessarily relying on scheduling or control information from another entity. For example, UEs 238, 240, and 242 may communicate over a direct link in a device-to-device (D2D), peer-to-peer (P2P), vehicle-to-everything (V2X), and/or in a mesh network. In a mesh network example, UEs 240 and 242 may optionally communicate directly with one another in addition to communicating with a scheduling entity (e.g., UE 238).

In some examples, UE 238 may be a transmitting sidelink device that reserves resources on a sidelink carrier for the transmission of sidelink signals to UEs 240 and 242 in a D2D or V2X network. Here, UEs 240 and 242 are each receiving sidelink devices. UEs 240 and 242 may, in turn, reserve additional resources on the sidelink carrier for subsequent sidelink transmissions.

In some examples, two or more UEs (e.g., UEs 226 and 228) within the coverage area of a serving base station 212 may communicate with both the base station 212 using cellular signals and with each other using sidelink signals 227 without relaying that communication through the base station. In this example, the base station 227 or one or both of the UEs 226 and 228 may function as scheduling entities to schedule sidelink communication between UEs 226 and 228. For example, UEs 126 and 128 may communicate sidelink signals 227 within a vehicle-to-everything (V2X) network.

Two primary technologies that may be used by V2X networks include dedicated short-range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 3:
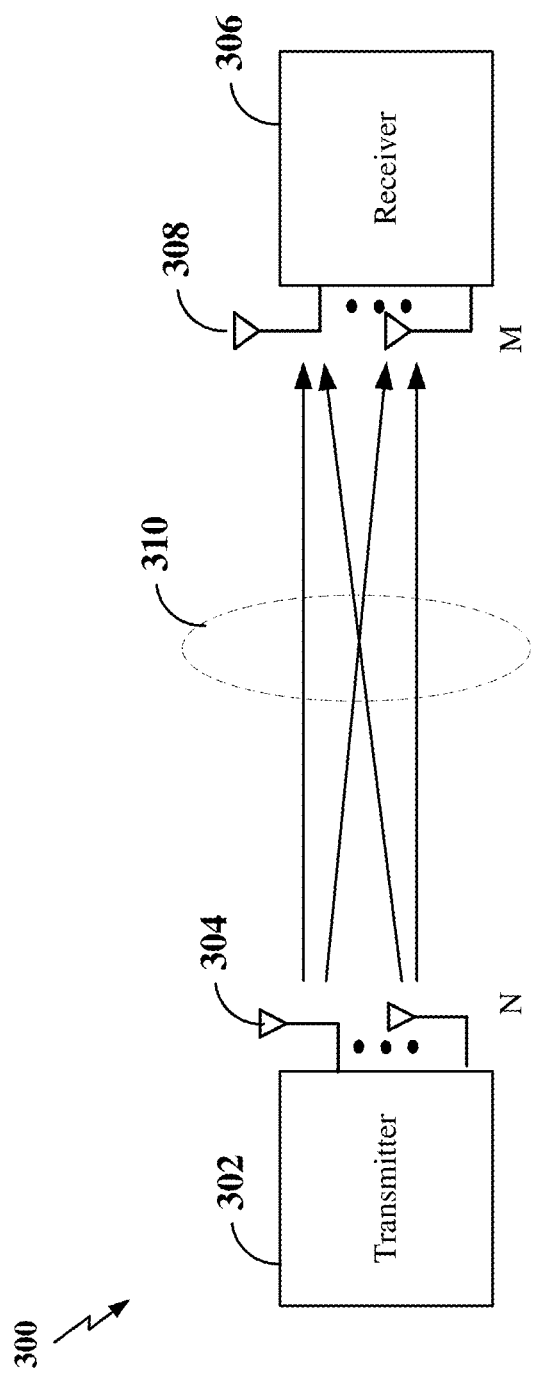
FIG. 3 is a block diagram illustrating a wireless communication system supporting multiple-input multiple-output (MIMO) communication.

In some aspects of the disclosure, the base station/scheduling entity and/or UE/scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a base station/scheduling entity 108, a UE/scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feedback the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers (also referred to herein as or interlaces) in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 4:
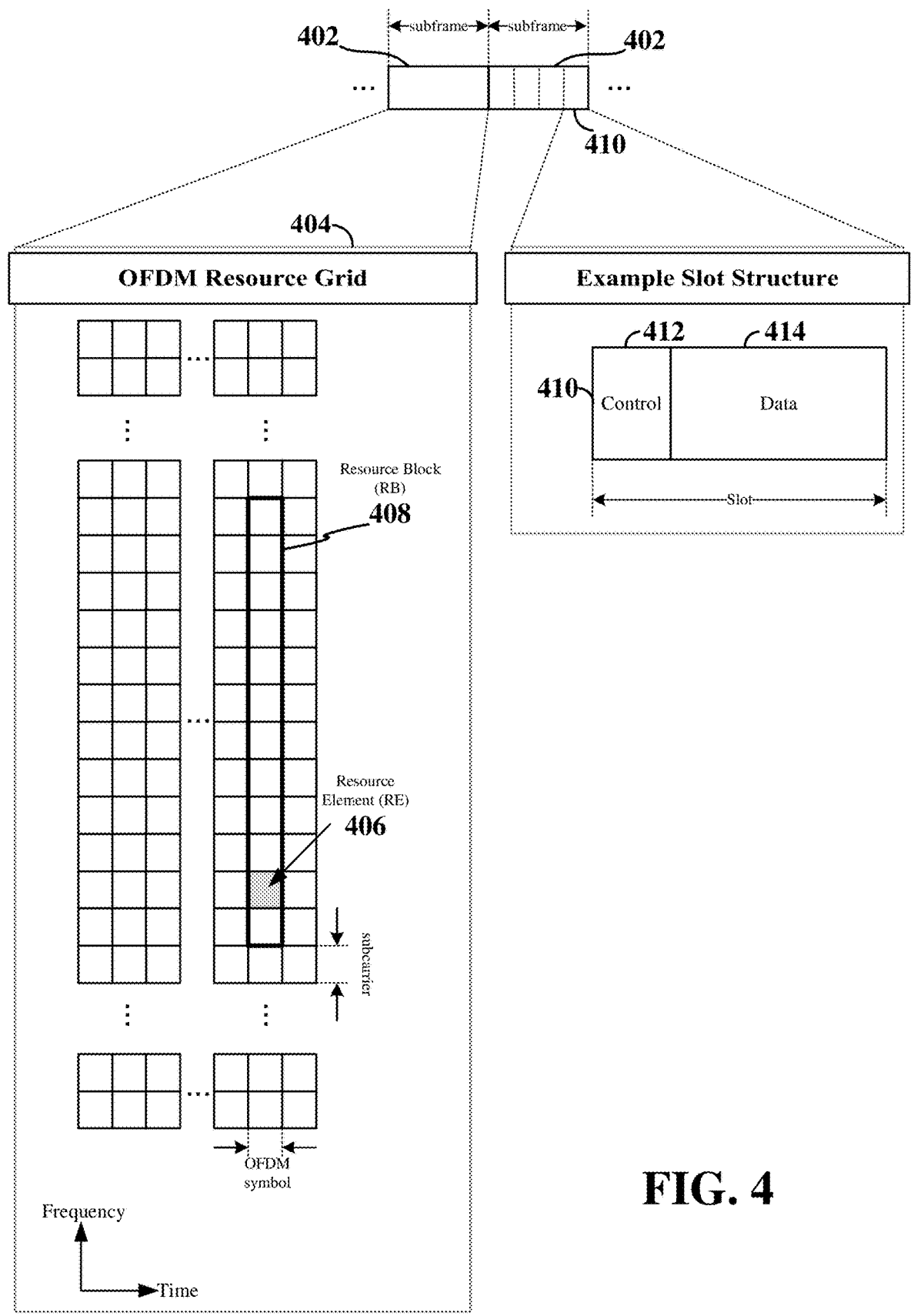
FIG. 4 is a schematic illustration of an organization of wireless resources in an air interface utilizing orthogonal frequency divisional multiplexing (OFDM)

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the transmitting device (e.g., the base station 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more UEs 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell, including but not limited to power control commands, scheduling information, a grant, and/or an assignment of REs for DL and UL transmissions.

In an UL transmission, the transmitting device (e.g., the UE 106) may utilize one or more REs 406 to carry UL control information 118 originating from higher layers via one or more UL control channels, such as a physical uplink control channel (PUCCH), a physical random access channel (PRACH), etc., to the base station 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the base station 108 to schedule uplink transmissions. Here, in response to the SR transmitted on the control channel 118, the base station 108 may transmit downlink control information 114 that may schedule resources for uplink packet transmissions. UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

In an example of sidelink communication over a sidelink carrier via a Proximity Service (ProSe) PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including the data transmitted by the initiating (transmitting) sidelink device within resources reserved over the sidelink carrier by the transmitting sidelink device.

The channels or carriers described above and illustrated in FIGS. 1 and 4 are not necessarily all the channels or carriers that may be utilized between a base station 108 and UEs 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
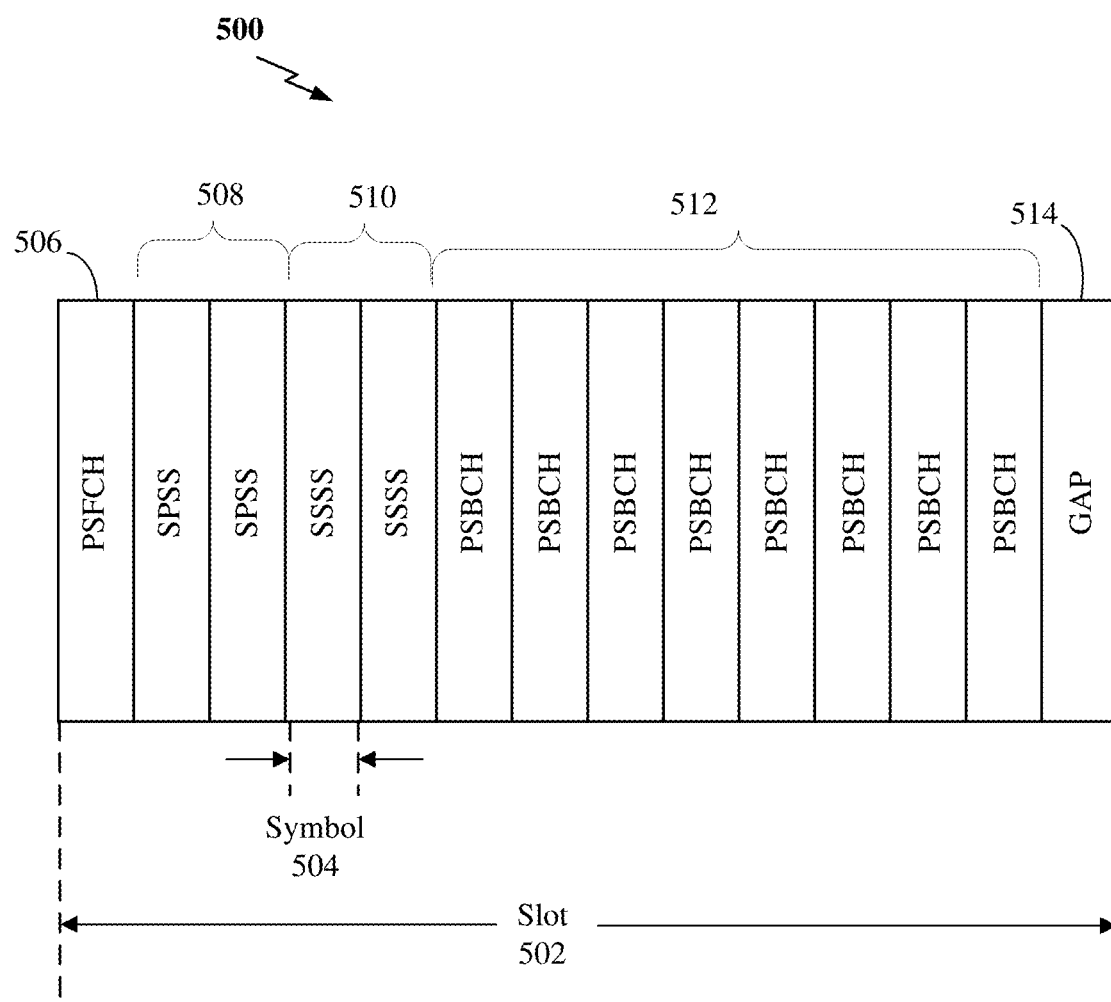
FIG. 5 is an illustration of a Physical Sidelink Broadcast Channel (PSBCH) synchronization signal block (SSB)

FIG. 5 is an illustration 500 of a Physical Sidelink Broadcast Channel (PSBCH) synchronization signal block (SSB) occupying slot 502 that includes a plurality of symbols 504, configured for NR sidelink communication. For NR sidelink communications, one sidelink bandwidth part (BWP) may be configured on a carrier, where the minimum unit for resource scheduling in the frequency domain is a subchannel, that may include 10, 15, 20, 25, 50, 75, or 100 consecutive RBs depending on practical configuration. Regarding the physical channels and reference signals of NR sidelink, PSSCH may be transmitted by a sidelink transmitting UE, which conveys sidelink transmission data, system information blocks (SIBs) for radio resource control (RRC) configuration, and a portion of sidelink control information (SCI). For the PSSCH, 16 quadrature amplitude modulation (QAM) and 64 QAM with low density parity check (LDPC) code may be utilized, and 256 QAM may also be applied, depending on the UE capability. The PSFCH may be communicated by a sidelink receiving UE for unicast and groupcast, and may convey 1-bit information over 1 RB for the HARQ acknowledgement (ACK) and the negative ACK (NACK). In some illustrative embodiments, channel state information (CSI) may be carried in the medium access control (MAC) control element (CE) over the PSSCH instead of the PSFCH.

When the traffic to be sent to a receiving UE arrives at a transmitting UE, a transmitting UE may first send the PSCCH, which conveys data including a part of sidelink control information (SCI) to be decoded by any UE for the channel sensing purpose, including the reserved time-frequency resources for transmissions, demodulation reference signal (DMRS) pattern and antenna port, etc. For the PSCCH, the SCI may be transmitted using quadrature phase shift keying (QPSK) with polar code. Another part of SCI may carry the remaining scheduling and control information to be decoded by the target receiving UE, and may share the associated PSSCH resources and the PSSCH DMRS with indications in the 1st-stage SCI for its resource allocation.

Similar to downlink transmissions in NR, in sidelink transmissions, primary and secondary synchronization signals (SPSS and SSSS, respectively) are supported, in which M-sequence and Gold sequence are used to generate the SPSS and SSSS, respectively. Through detecting the SPSS and SSSS, a UE is able to identify the sidelink synchronization identity (SSID) from the UE sending the SPSS/SSSS, where there may be, for example, 2 SPSS sequences and 336 SSSS sequences forming 672 SSIDs. Through detecting the SPSS/SSSS, a UE is therefore able to know the characteristics of the UE transmitting the SPSS/SSSS. A series of processes of acquiring timing and frequency synchronization together with SSIDs of UEs may be performed during initial cell search. In some examples, the UE sending the SPSS/SSSS may not be necessarily involved in sidelink transmissions, and a node (e.g., UE/eNB/gNB) sending the SPSS/SSSS may operate as a synchronization source.

The example of FIG. 5 shows a slot that includes a PSFCH symbol 506, followed by a plurality of SPSS symbols 508 and SSSS symbols 510 for synchronization. After synchronization, a plurality of PSBCH symbols 512 are provided, followed by a gap symbol 514 that may be utilized as a guard period. The PSBCH 512 is transmitted along with the SPSS/SSSS as a synchronization signal/PSBCH block (SSB), as shown in the figure which illustrates the structure of SSB for a normal cycle prefix (NCP). The SSB may have the same numerology as PSCCH/PSSCH on the carrier, and an SSB is transmitted within the bandwidth of the configured BWP. In some examples, the PSBCH symbol data 512 conveys information related to synchronization, such as the direct frame number (DFN), indication of the slot and symbol level time resources for sidelink transmissions, in-coverage indicator, etc. The SSB may be transmitted periodically, for example, at every 160 ms. In addition, there may be N repetitions within the 160 ms period with configurable starting offset and the interval. N may be configured depending on the SCS. Physical reference signals, such as channel state information reference signal (CSI-RS) may also be used for sidelink transmissions.

Figure 6:
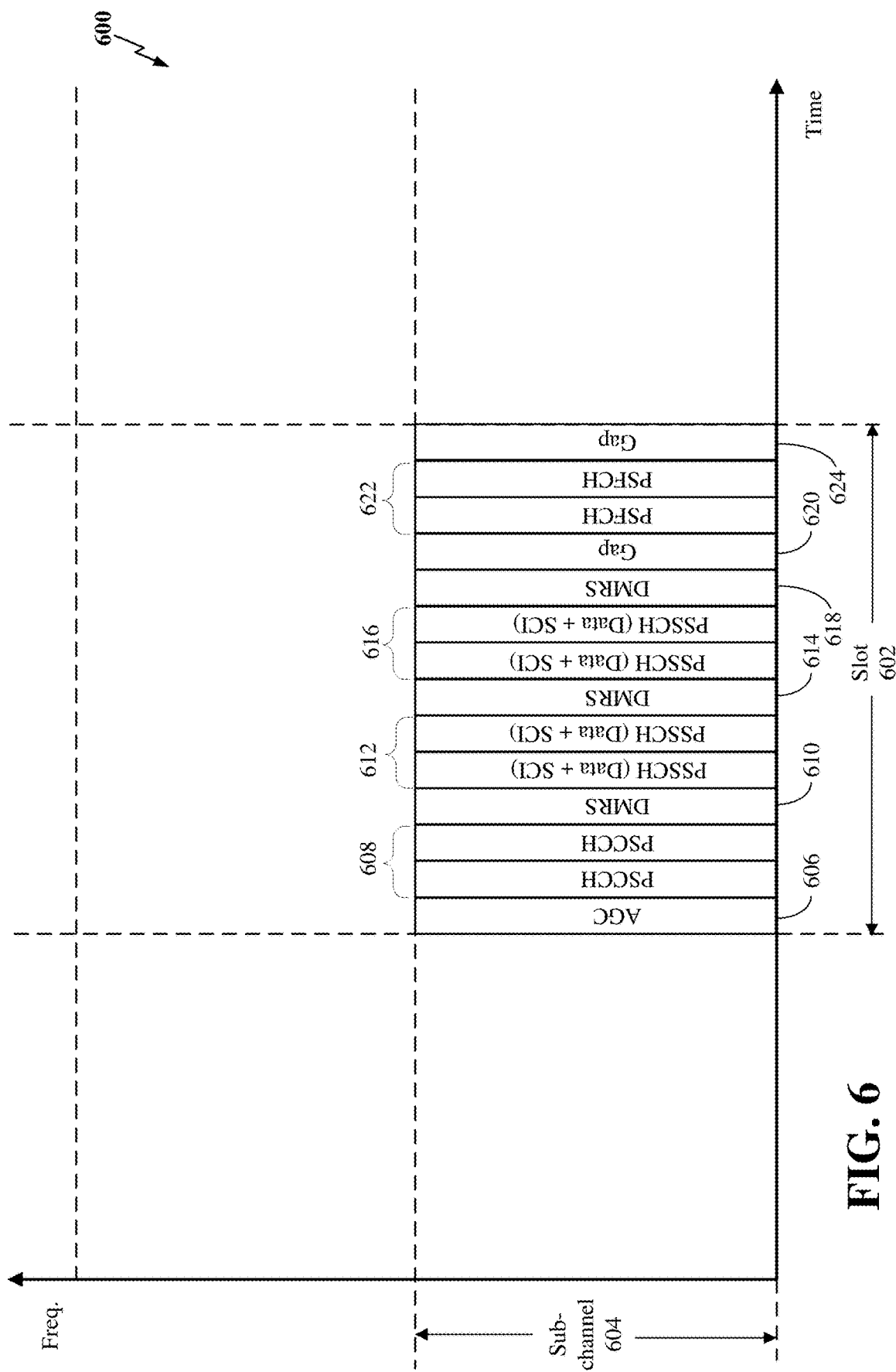
FIG. 6 is an illustration of NR sidelink transmission, with multiplexing of physical sidelink control channel (PSCCH), physical sidelink shared channel (PSSCH) and associated physical sidelink feedback channel (PSFCH) in both the time and frequency domains.

FIG. 6 is an illustration of NR sidelink transmission, with multiplexing of physical sidelink control channel (PSCCH), physical sidelink shared channel (PSSCH) and associated physical sidelink feedback channel (PSFCH) in both the time and frequency domains. In this example, the figure illustrates data occupying a slot 602 of a plurality of slots (shown as dotted lines) in the time domain for a subchannel 604 of a plurality of subchannels in the frequency domain. For NR sidelink transmissions, multiplexing of PSCCH 608, PSSCH 612, and associated PSFCH 622 is illustrated in the figure, where the PSCCH 608 and the PSSCH 612 can be multiplexed both in the time and frequency domains. It should be noted that in the example of FIG. 6, PSSCH 612 is shown as occupying one subchannel (604), while PSCCH may span over multiple subchannels in general.

In the example, automatic gain control (AGC) symbol 606 may be used to assist in regulating the signal strength at the input of the ADCs such that the required signal SNR for proper decoding is met. The PSCCH symbols 608 can occupy a number of consecutive RBs in the starting subchannel of the PSSCH transmission, e.g., over 2 or 3 symbols at the beginning of a slot, while the PSSCH 612, 616 may span over multiple subchannels, with associated DMRS symbols 610, 614, 618. In some examples, the last two symbols 622, excluding the gap (or guard period (GP)) 620, 624 are able to accommodate the PSFCH at every one, two, or four slots. Given a certain time-frequency location of the PSSCH, the candidate resources of the corresponding PSFCH should be identified first in order to identify the "actual" time-frequency location (resources) of the corresponding PSFCH.

Figure 7:
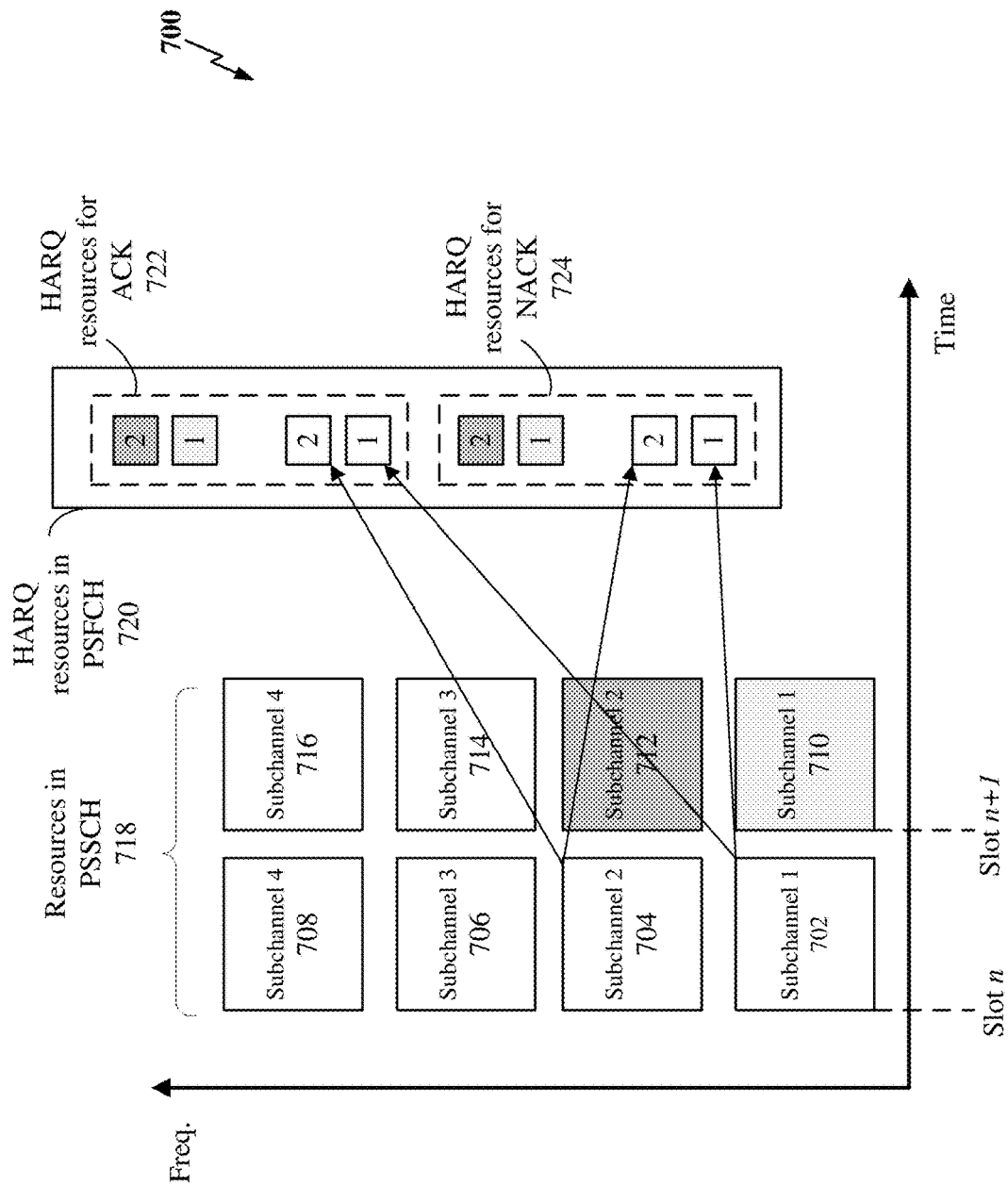
FIG. 7 is an illustration of association of resource blocks in subchannels of physical sidelink shared channel (PSSCH) and physical sidelink feedback channel (PSFCH)

FIG. 7 is an illustration 700 of association (mapping) of resource blocks in subchannels of physical sidelink shared channel (PSSCH) and physical sidelink feedback channel (PSFCH). In this example, resources (RBs) in the PSSCH 718 are shown as subchannels 1-4 (702-708) in time slot n, and subchannels 1-4 (710-716) in time slot n+1. The subchannels (702-708, 710-716) are configured in their respective frequency bins as shown along the frequency axis in the figure. In this simplified example, the HARQ resources in PSFCH 720 include HARQ resources for ACK 722 and HARQ resources for NACK 724, where RB's for each subchannel in PSSCH (702-708, 710-716) are associated in PSFCH 720 as shown in the figure. For slot n, it can be seen that subchannel 1 702 is associated with block "1" in each of HARQ resources for ACK 722 and NACK 724. Similarly, subchannel 2 704 is associated with block "2" in each of HARQ resources for ACK 722 and NACK 724. For slot n+1, it can be seen that subchannel 1 710 and subchannel 2 712 are similarly associated with RBs "1" and "2", respectively, where subchannel 1 710 is represented in the figure with light shading, and subchannel 2 712 is represented in the figure with darker shading.

For a PSSCH transmission, candidate resources of the corresponding PSFCH (720) may be configured as a set of RBs associated with the starting subchannel and slot used for that PSSCH (718). Within the set of RBs configured for the actual PSFCH transmission, the first x number of RBs are associated with the first subchannel in the first slot associated with the PSFCH slot, the second x number of RBs are associated with the first subchannel in the second slot associated with the PSFCH slot, and so on, as illustrated in the figure. The frequency resources for the actual PSFCH transmission may be indicated by a bitmap for RBs in a resource (comb) pool. For each PSFCH, resources for ACK and NACK may be separated.

Figure 8:
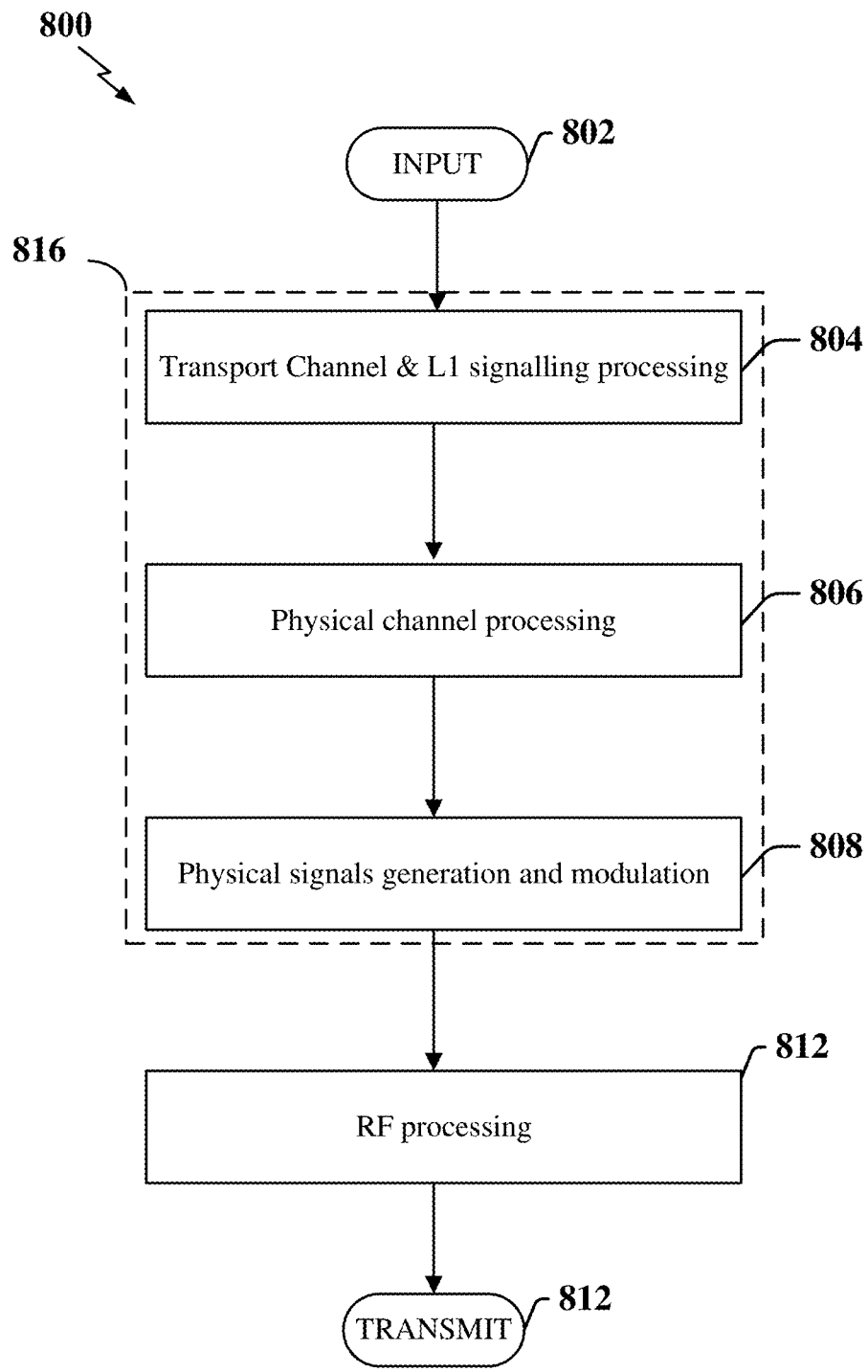
FIG. 8 is an illustration of physical sidelink shared channel (PSSCH) communication utilizing channel state information (CSI) triggering.

FIG. 8 is a block diagram 800 illustrating sidelink baseband processing under an illustrative example. An input is generated or received in block 802, which may include relevant communication data including, but not limited to, a sidelink (SL) Master Information Block (MIB-SL), a discovery transport block, SCI format 0/1, and a communications transport block. From here the input is subjected to sidelink baseband processing 816 generally designated as a dotted box in the figure. In some examples, transport channel & layer 1 (L1) signaling processing block 804 assists in timing synchronization and system information acquisition, sidelink discovery and sidelink communication, and handles processing of a broadcast transport channel (SL-BCH), sidelink discovery transport channel (SL-DCH) and sidelink communication transport channel (SL-DCH).

Transport channel & L1 signaling processing block 802 may be configured to perform code block segmentation and CRC attachment processing, as well as transport block CRC attachment processing. In addition, transport channel & L1 signaling processing block 804 may perform channel coding, rate matching and interleaving before forwarding a communication signal to physical channel processing block 806, which handles PSBCH, PSDCH, PSCCH and PSSCH processing. Physical channel processing block 806 may be configured to perform scrambling, modulation, transform precoding and mapping to physical resources, before the signal is handled by the physical signal generation and modulation block 808, which includes SL-DMRS, PSSS and SSSS signal processing, among others. The physical signals generation and modulation block 808 engages in demodulation of reference signals and processing of synchronization preambles in order to map symbols to physical resources and modulate the signals using, for example, single-carrier frequency division multiple access (SC-FDMA) before processing the signal for RF processing in block 812 and subsequent transmission in block 812.

Generally, timing synchronization and system information acquisition is facilitated by a broadcast transport channel, SL-BCH, and its physical counterpart, PSBCH. These channels may be considered similar to the BCH/PBCH broadcast channel used in LTE DL for cell and system acquisition support. The channels may be used for broadcasting a set of pre-ambles and basic system information within a certain region. A set of primary and secondary preambles, PSSS and SSSS, are used for synchronization purposes. The SL Master Information Block, MIB-SL carries the sidelink system information. Sidelink discovery may facilitated through a transport channel, SL-DCH and its physical counterpart, PSDCH. SL-DCH may follow the Downlink Shared Channel structure. In some examples, higher-layer specifications are absent in the discovery mode, since the announcement messages sent by UEs are PHY Transport Blocks formed with zero MAC overhead. Filling the TB payload may be left open and may depend on applications, such as proximity services (ProSe). Sidelink communication may be facilitated using a transport channel, SL-SCH, and its physical counterpart, PSSCH. In order for a receiving UE to successfully decode the physical communication channels, information regarding the specific resources assigned for transmission and the transmission configuration is needed, and are carried in the sidelink control channel, (SCI), which resembles a downlink DCI concept. The SCI may be carried in the PSCCH channel, and may be configured under SCI Format 0 and/or SCI Format 1. Physical channel estimation is enabled by SL demodulation reference signals (SL-DMRS). SL-DMRSs may be multiplexed with the payload of the PSBCH, PSDCH, PSCCH, and PSSCH. In some examples, two DMRS symbols may be used per subframe for PSBCH, PSDCH, PSCCH, and PSSCH. In further examples, three DMRS symbols may be used for PSBCH, and four symbols for PSCCH and PSSCH.

Regarding sidelink communication, such as 3GPP Rel-16 NR V2X, channel state information (CSI-RS) is configured to be aperiodic and is included in PSSCH. Typically, only one resource element (RE) per resource block (RB) (density 1) is provided and only 1 or 2 ports are supported. For communication in the unlicensed spectrum or band (NR-U) (e.g., 5.125-7.125 GHz), interlace waveforms are defined to satisfy occupied channel bandwidth (OCB) requirements in the unlicensed band. However, when PSSCH is configured to an interlaced waveform, specific challenges may arise regarding the transmission of CSI-RS, since, for example, in legacy systems (i.e., pre-3GPP Rel-16 NR), the CSI-RS waveforms may not match. Accordingly, there is a need to multiplex legacy SL CSI-RS waveforms with the PSSCH waveform. Interlaced CSI-RS waveforms have been difficult to incorporate into PSCCH, as they would add additional complexity to channel estimation. CSI-RS in sidelink is configured into a comb-like signal that occupies 1 or 2 contiguous REs per RB for 1 or 2 channel ports, respectively. Thus, for example, if one port is being used, CSI-RS occupies one RE per RB, and if two ports are being used, CSI-RS would occupy two contiguous REs per RB. For example, for 1 port CSI-RS, comb-like resource mapping in the frequency domain without CDM may be used, where, for density of 1 or 0.5 REs/PRB, comb-12 may be used within a PRB while every other PRB may be mapped for density of 0.5 REs/PRB.

A UE may transmit sidelink CSI-RS within a PSSCH transmission, provided that CSI reporting is enabled by higher level parameter and a CSI request field in the corresponding SCI format is triggered or set (e.g., to "1"). Parameters for CSI-RS transmission may be configured via a higher layer parameter, for example, to indicate the number of ports for SL CSI-RS, the first OFDM symbol in a PRB used for SL CSI-RS and/or frequency domain allocation for SL CSI-RS.

Figure 9:
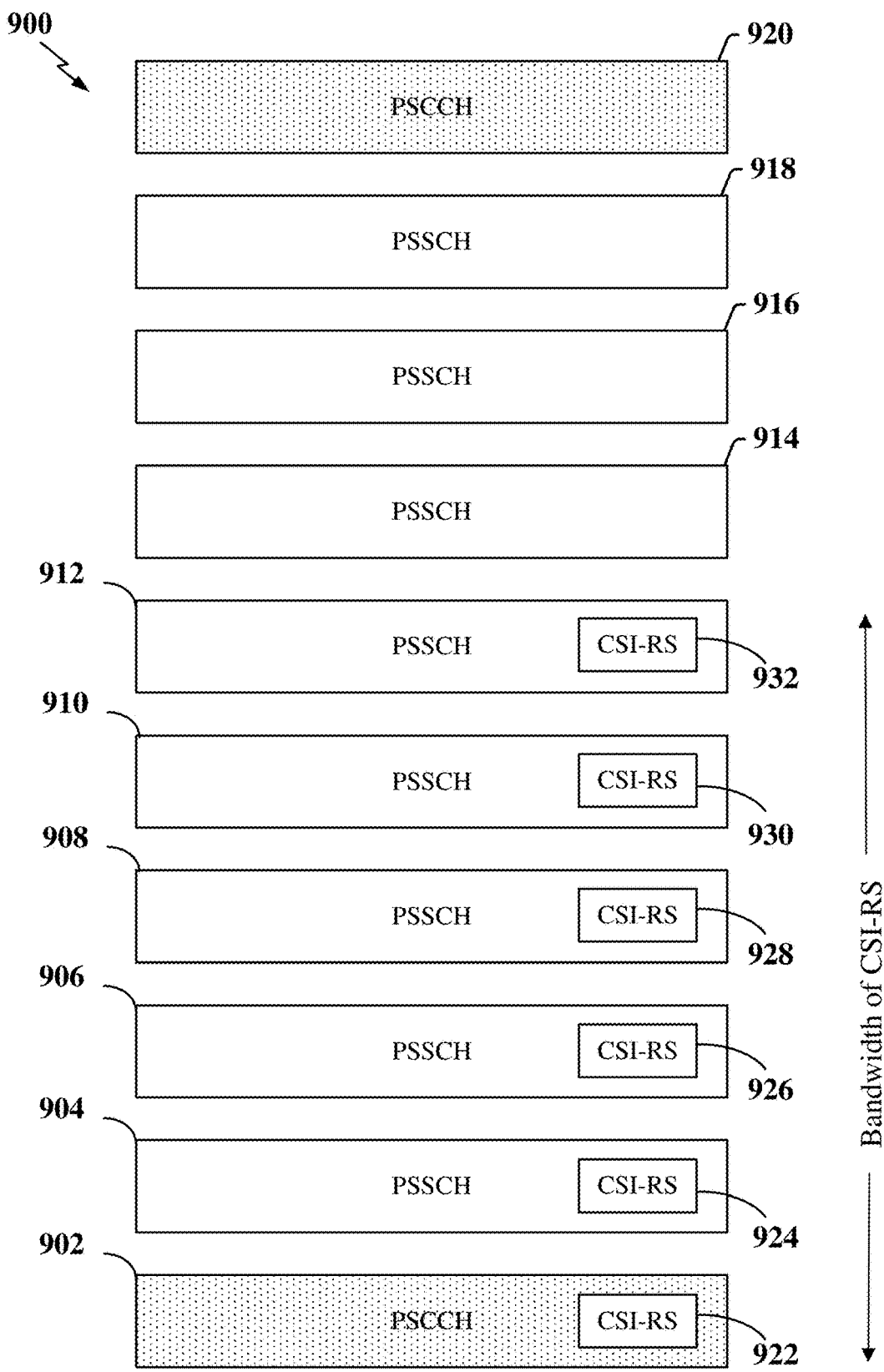
FIG. 9 is an illustration of an interlaced waveform for including channel state information reference signal (CSI-RS) in PSCCH and PSSCH resource blocks.

FIG. 9 is an illustration of an interlaced waveform 900 for including channel state information reference signal (CSI-RS) in PSCCH and PSSCH resource blocks. When transmitting CSI-RS, it is advantageous to transmit the signal in the same resource pool as PSSCH, as this improves interference management by capturing the interference in the same interlace of PSSCH, and thus reflect the "true" channel quality indicator (CQI) for the interference. This may be achieved using the configuration of FIG. 9, where, in this example, CSI-RS (922-932) is interlaced into PSCCH 902 and PSSCH 902-912, utilizing the illustrative CSI-RS bandwidth shown in the figure. The CSI-RS may be mapped to the RBs within the interlace pool resources where PSCCH and PSSCH is transmitted. In some examples, CSI-RS is triggered by SCI 0-2 and transmitted along with PSSCH. In configurations where PSCCH is transmitted at the edge RBs (e.g., 902, 920) of the interlace, CSI-RS may be mapped in the RBs similarly as in PSSCH.

In some examples, CSI-RS may be mapped to a partial interlace, where RRC may configure a starting resource block, CSI-RS bandwidth, and the number of consecutive resource blocks that CSI-RS will occupy in an interlace (e.g., six: 922-932). By configuring CSI-RS to occupy only a portion of an interlace, CSI-RS overhead may be reduced and may further help avoid PSSCH resource block clusters to appear on two edges of an interlace. In some examples, CSI-RS may be configured to occupy half of the interlace. To further reduce CSI-RS density, the CSI-RS may be mapped to a down-sampled subset of resource blocks from the interlace (e.g., every other resource block in each resource block cluster). In sidelink CSI-RS, resources may be configured for one or two resource elements for one or two ports per resource block. In one example, for interlaced CSI-RS waveforms, two CSI-RS resource elements may be spaced 1.8 MHz apart. However, in such a configuration, there may be insufficient CSI-RS resource elements to have good channel estimation for each resource block cluster.

Figure 10:
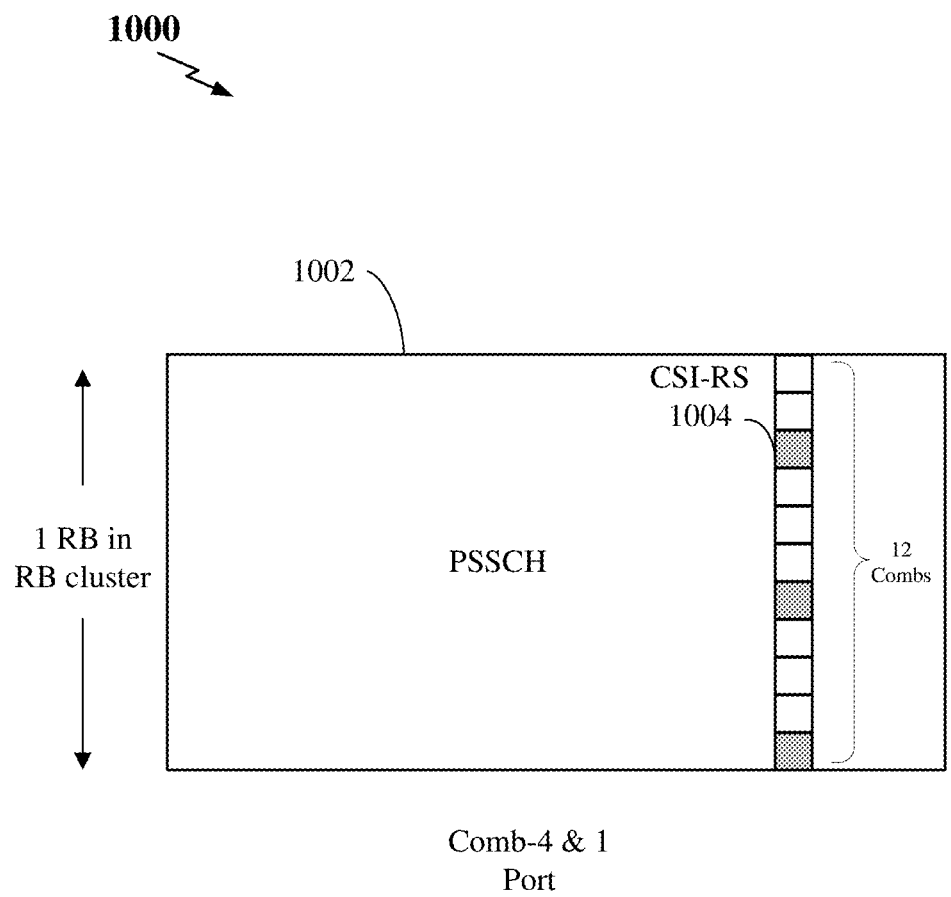
FIG. 10 is an illustration of a PSSCH signal with interlaced CSI-RS for a comb-4, one port configuration.

FIG. 10 is an illustration 1000 of a PSSCH signal 1002 with interlaced CSI-RS 1004 for a comb-4, one port configuration. In this example, the figure shows a 12-comb structure, where a CSI-RS (1004), and copies of the CSI-RS occupy each shaded comb in the figure. In various examples, different configurations utilizing comb-6 (e.g., 2 CSI-RS occupying every 6 combs), comb-4 (e.g., 3 CSI-RS occupying every 4 combs), comb-3 (e.g., 4 CSI-RS occupying every 3 combs) and comb-2 (e.g., 6 CSI-RS occupying every 2 combs) may be utilized, depending on the application. Such configurations may advantageously provide better CQI for each resource block cluster. The example of FIG. 10 shows an example of a comb-4 configuration for one port, where three CSI-RS occupy every 4 combs in PSSCH.

Figure 11:
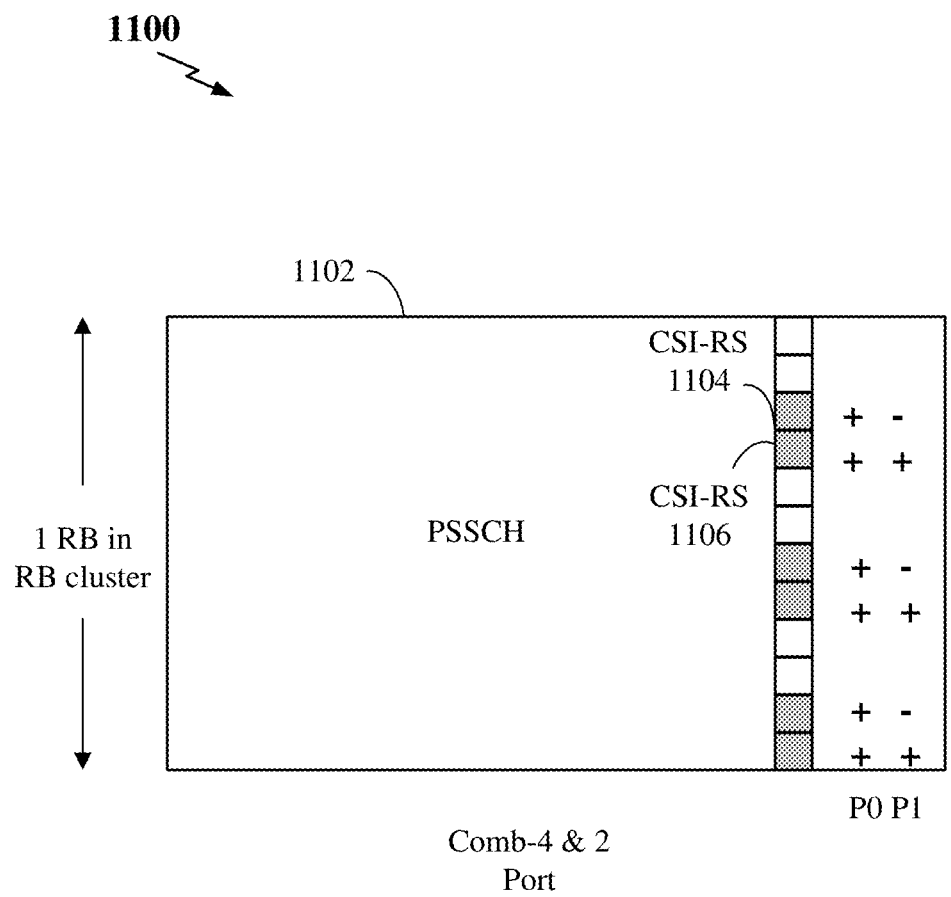
FIG. 11 is an illustration of a PSSCH signal with interlaced CSI-RS for a comb-4, two port configuration.

FIG. 11 is an illustration 1100 of a PSSCH signal 1102 with interlaced CSI-RS (1104) for a comb-4, two port configuration. The PSSCH signal 1102 is similar to PSSCH signal 1002 of FIG. 10, except that the CSI-RSs are configured as two contiguous CSI-RSs 1104, 1106 per comb. In some examples, two ports (P0, P1) are code division multiplexed in frequency (+,−) to produce the two contiguous CSI-RSs in a comb-4 configuration.

Figure 12:
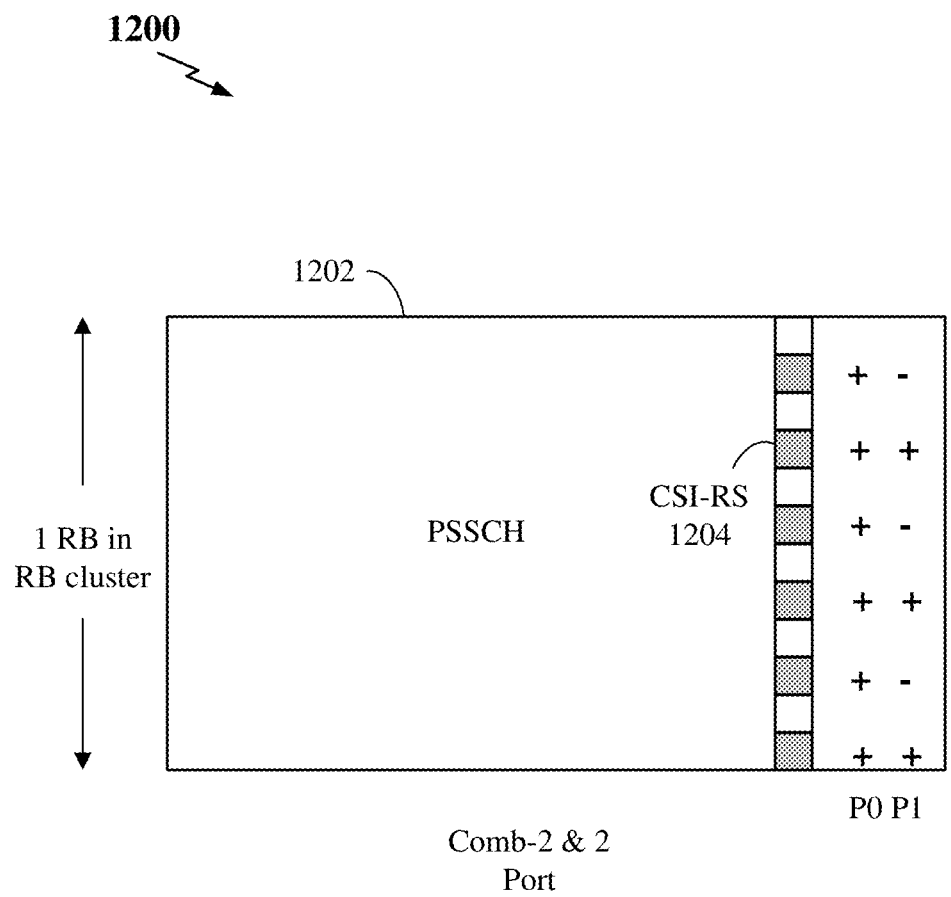
FIG. 12 is an illustration of another PSSCH signal with interlaced CSI-RS for a comb-2, two port configurations.

FIG. 12 is an illustration 1200 of another PSSCH signal 1202 with interlaced CSI-RS for a comb-2, two port configuration. The PSSCH signal 1202 is similar to the signal 1102 of FIG. 11, except that here CSI-RS 1204 is configured in a comb-2 arrangement, occupying 6 alternating combs in the 12-comb structure for the two ports P0, P1. In one example, to achieve this arrangement, an orthogonal cover code (OCC) is applied on CSI-RS resource elements in the frequency domain to differentiate two ports, and the two ports are then CDMed (+−) also in the frequency domain.

In some examples, CSI-RS density may be increased in an interlaced waveform by utilizing the time and frequency domain. Here, an OCC is applied on CSI-RS resource elements in the frequency domain to differentiate two ports, and the two ports are then CDMed also in the frequency domain, as described above. This process may then be repeated in adjacent or distributed symbols (resource elements) in every resource block cluster. Distributed CSI-RS symbols may be advantageous in capturing short burst interference, while adjacent symbols may be advantageous in high mobility scenarios for obtaining improved CQI estimation for each RB cluster.

Figure 13:
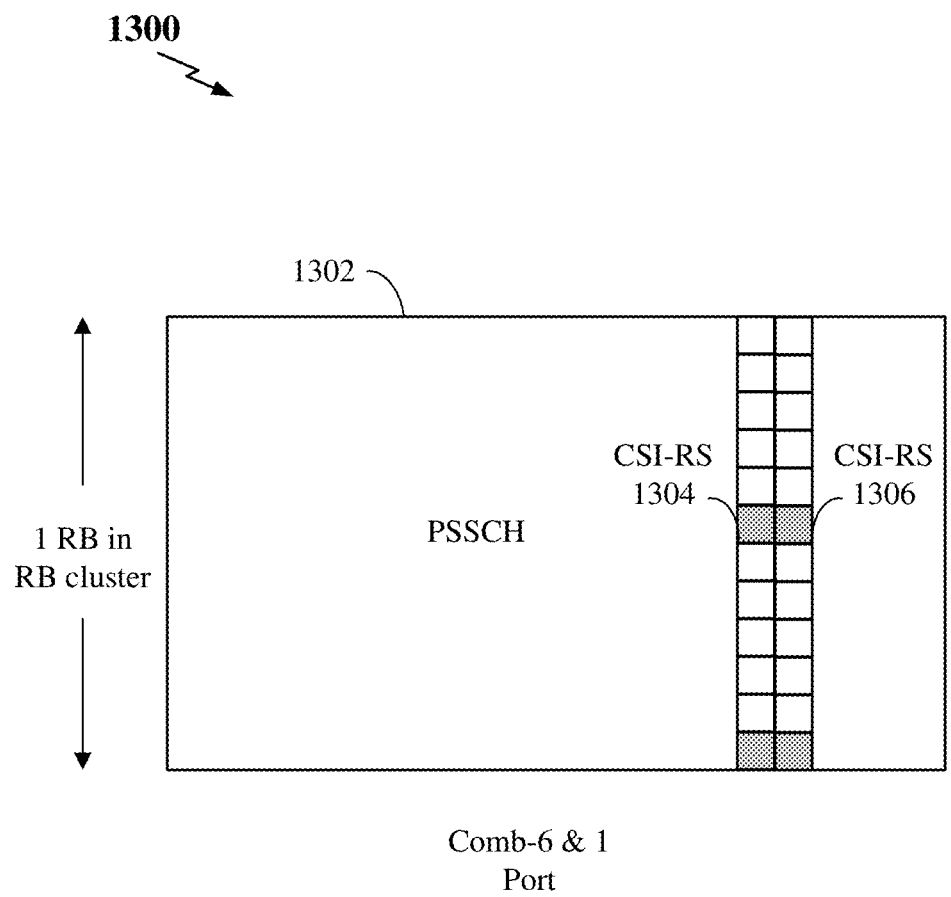
FIG. 13 is an illustration of a PSSCH signal with interlaced CSI-RS for a comb-6, one port configuration.
Figure 14:
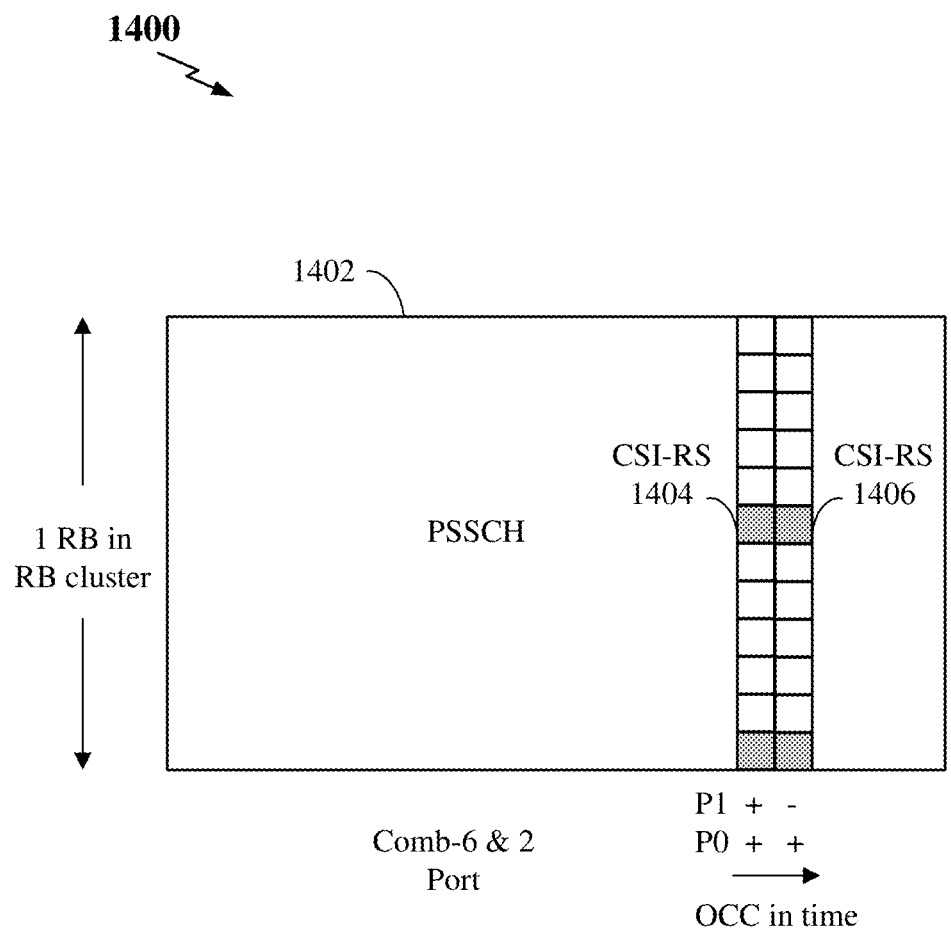
FIG. 14 is an illustration of a PSSCH signal with interlaced CSI-RS for a comb-6, two port configuration.

FIG. 13 is an illustration 1300 of a PSSCH signal 1302 with interlaced CSI-RS 1304, 1306 for a comb-6, one port configuration. In this example, the CSI-RS 1304 is provided in one symbol for every 6 combs as shown in the shaded symbols, and then duplicated (CSI-RS 1306) in the adjacent symbol in the frequency domain. FIG. 14 is an illustration 1400 of a PSSCH 1402 signal with interlaced CSI-RS for a comb-6, two port configuration. The PSSCH signal 1402 is similar to the PSSCH signal 1302 of FIG. 3, except that two ports are being utilized. In order to differentiate between two antennas for the ports, OCC is applied in the time domain as shown for ports P0 and P1.

Figure 15:
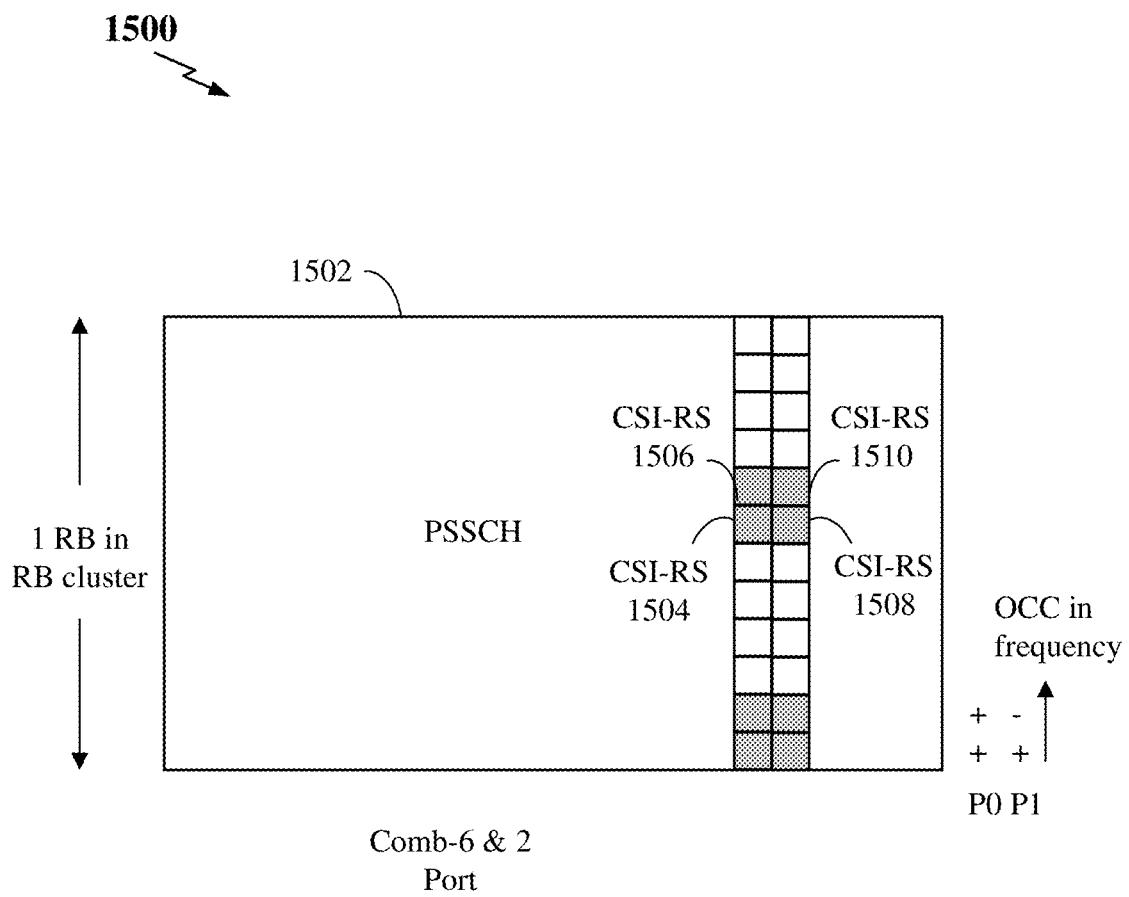
FIG. 15 is an illustration of another PSSCH signal with interlaced CSI-RS for a comb-6, one port configuration.

FIG. 15 is an illustration 1500 of another PSSCH signal 1502 with interlaced CSI-RS for a comb-6, two port configuration. The PSSCH signal 1502 is similar to the PSSCH signal 1102 of FIG. 11, where the CSI-RSs are configured as one set of comb-6 CSI-RS symbols 1504, with another set of comb-6 CSI-RS symbols 1506 being contiguous to the first set. The CSI-RS symbols may then be copied/replicated to an adjacent comb to have a similar structure, where one set of comb-6 symbols 1508 and another set of comb-6 symbols 1510 are contiguous to each other. In order to differentiate between two antennas for the ports, OCC is applied in the frequency domain as shown for ports P0 and P1.

Figure 16:
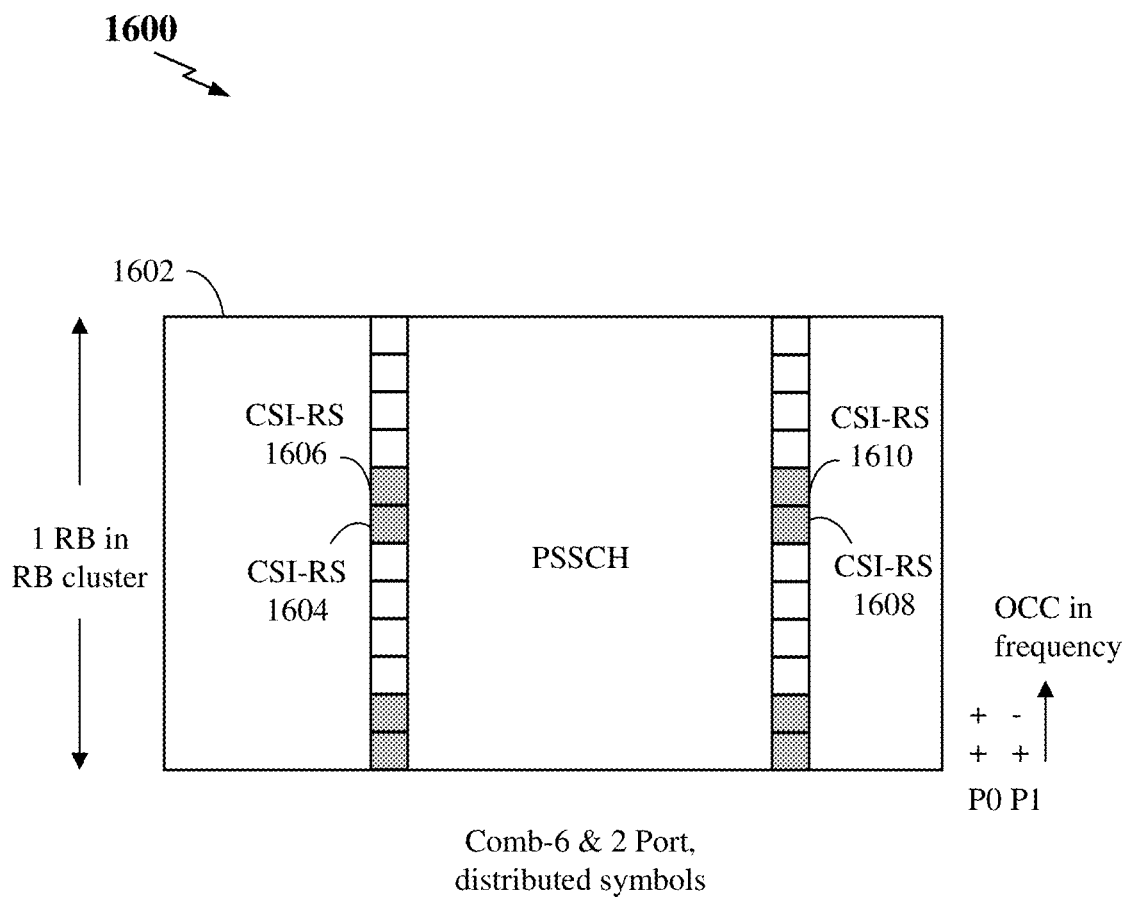
FIG. 16 is an illustration of a PSSCH signal with interlaced CSI-RS for a comb-6, two port configuration having distributed signals.

FIG. 16 is an illustration 1600 of a PSSCH signal 1602 with interlaced CSI-RS for a comb-6, two port configuration having distributed signals. PSSCH signal 1602 may be similar to the PSSCH signal 1502 of FIG. 15, where the CSI-RSs are configured as one set of comb-6 CSI-RS symbols 1604, with another set of comb-6 CSI-RS symbols 1506 being contiguous to the first set. The CSI-RS symbols may then be copied/replicated to another distributed, non-adjacent comb to have a similar structure, where one set of comb-6 symbols 1608 and another set of comb-6 symbols 1610 are contiguous to each other. As before, in order to differentiate between two antennas for the ports, OCC is applied in the frequency domain as shown for ports P0 and P1.

Figure 17:
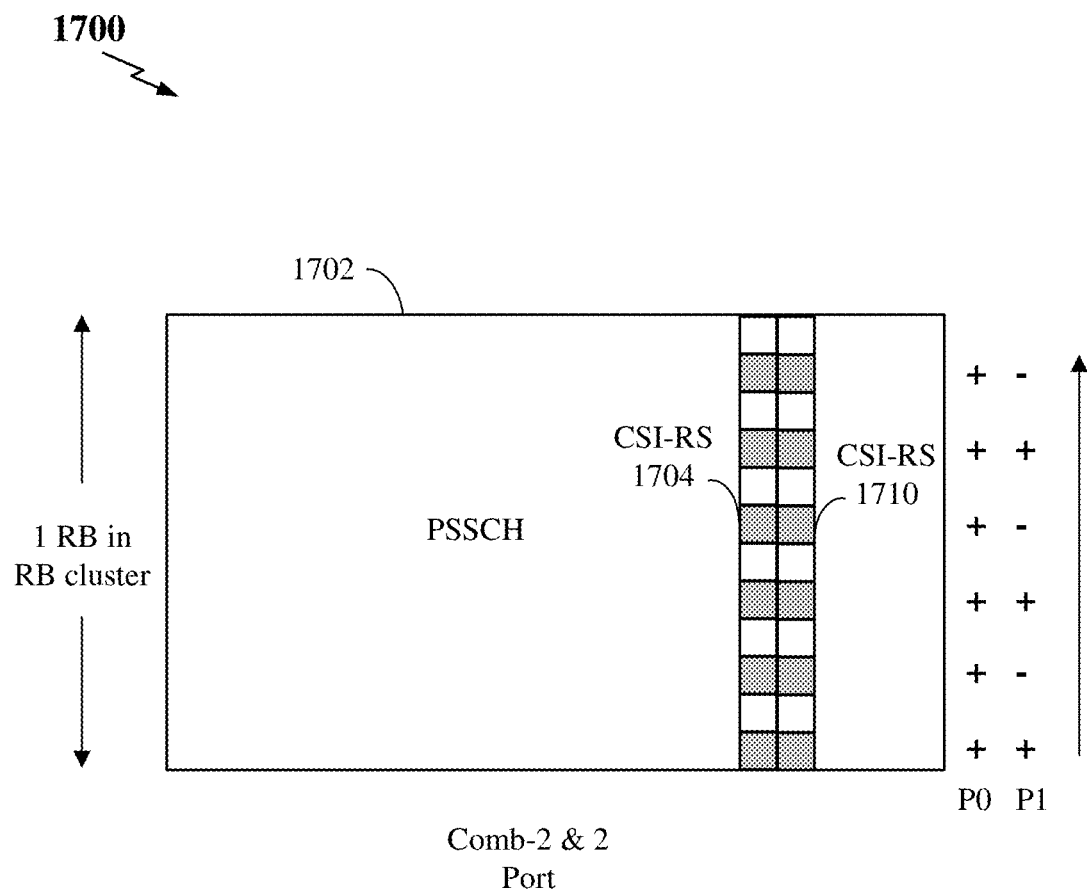
FIG. 17 is an illustration of a PSSCH signal with interlaced CSI-RS for a comb-2, two port configuration.
Figure 18:
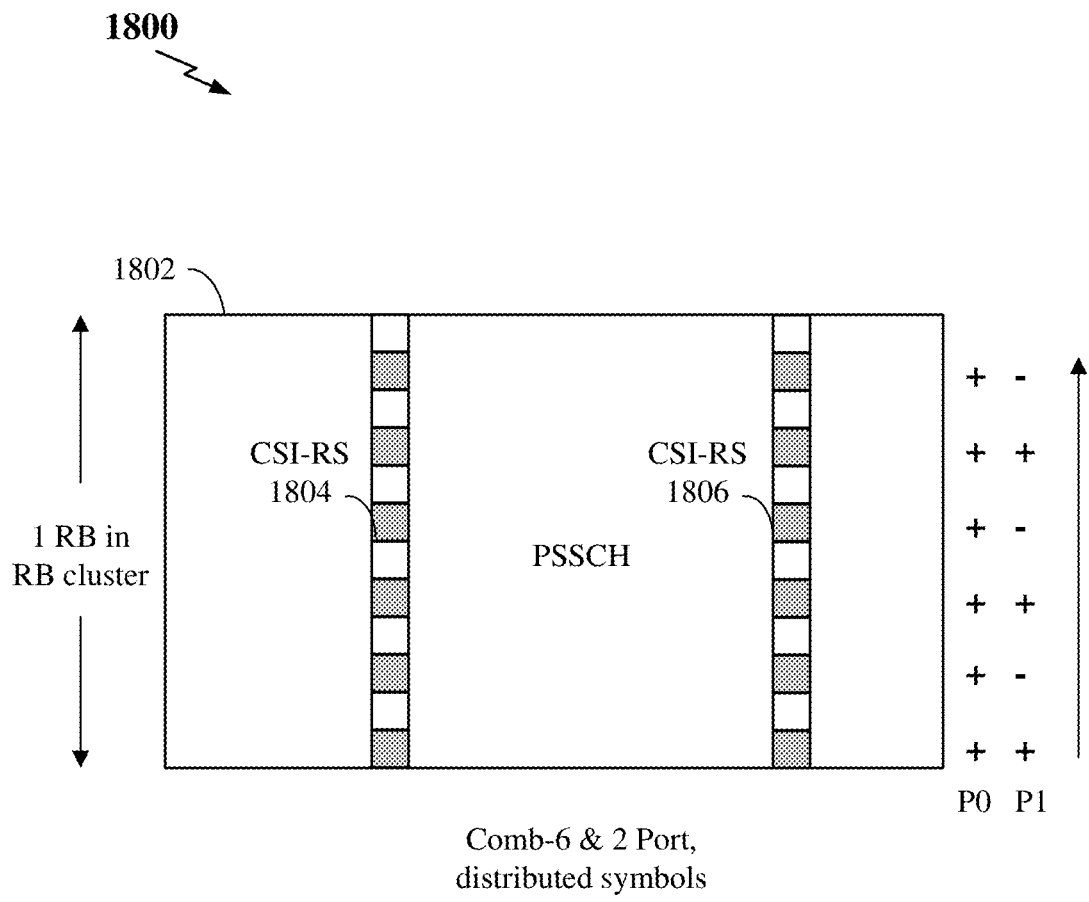
FIG. 18 is an illustration of a PSSCH signal with interlaced CSI-RS for a comb-2, two port configuration having distributed symbols.

FIG. 17 is an illustration 1700 of a PSSCH signal 1702 with interlaced CSI-RS for a comb-2, two port configuration. Here, the PSSCH signal 1702 may be similar to PSSCH signal 1202 in FIG. 2, where CSI-RS 1704 is arranged in a comb-2 configuration in the comb structure. However, to densify the CSI-RS signals, another CSI-RS 1710 may be copied/replicated in an adjacent comb as is shown in the figure. FIG. 18 is an illustration 1800 of a PSSCH signal 1802 with interlaced CSI-RS for a comb-2, two port configurations having distributed symbols. Here, the PSSCH signal 1802 has CSI-RS symbols 1804 distributed in a com-s configuration and CSI-RS symbols 1806 distributed in another comb, similar to the PSSCH signal 1702 of FIG. 17, except that, instead of configuring the combs to be adjacent, they are distributed within the PSSCH signal 1802 as shown in the figure. For two-port cases, in some examples, CDM may be applied using OCC/CDM in the time domain, but only for adjacent CSI-RS symbol arrangements (e.g. FIG. 17). OCC/CDM may be generally applied in the frequency domain for both adjacent (e.g., FIG. 17) and distributed (e.g., FIG. 18) configurations.

For the various embodiments described herein, CSI-RS may be designed to occupy a configurable number of resource elements and symbols, and they may be contiguous. In some examples, the starting position and the number of resource elements of CSI-RS may be configured via RRC. Similarly, the symbol locations of the CSI-RS may be configured by RRC. In certain cases, however, such as a high-mobility UE, contiguous symbols may need to be specifically arranged to address such circumstances. In some examples, CSI-RS may be configured to spread out over time to capture short burst interference. In extreme cases, CSI-RS may be configured to occupy all 12 combs (resource elements) per resource block. As discussed above, OCC may be applied in two-port configurations in either the time domain or frequency domain to differentiate between the two ports. In some examples, only OCC in the time domain is applied if CSI-RS symbols are contiguous.

Figure 19:
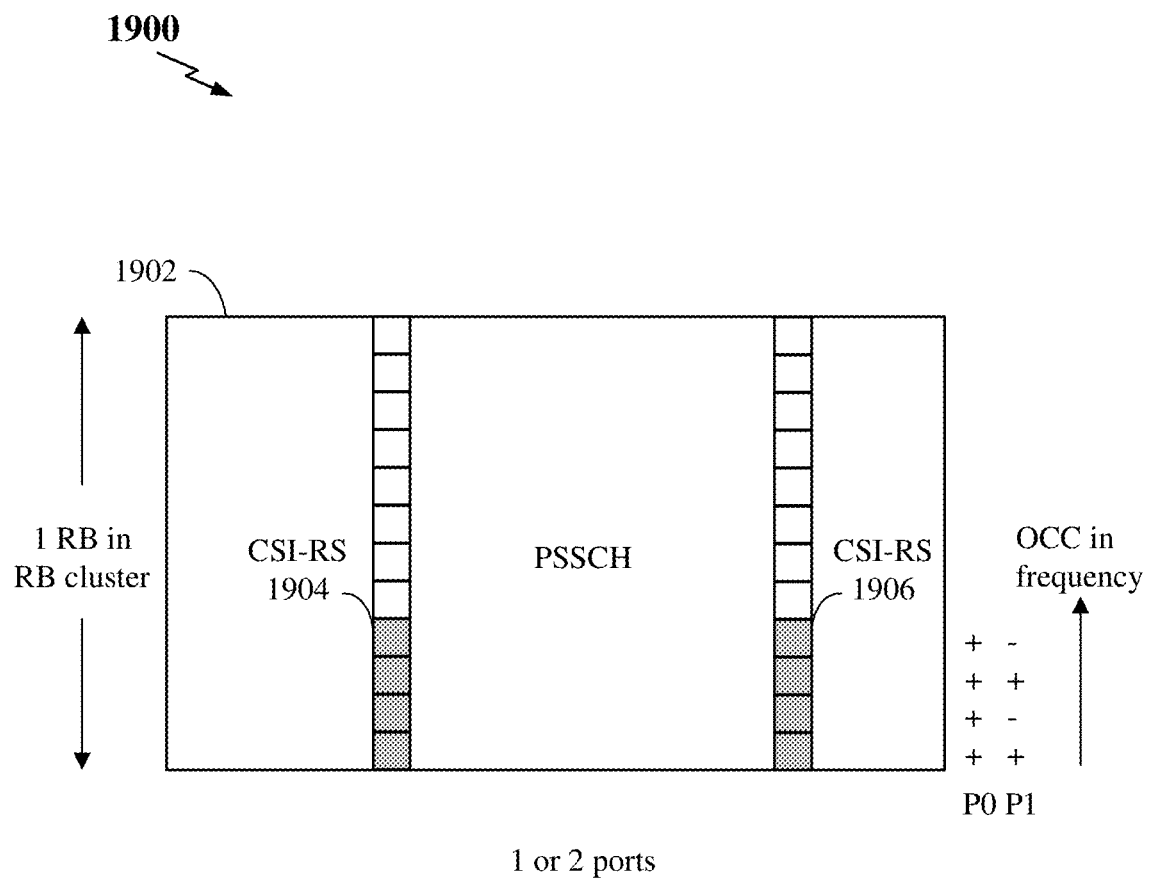
FIG. 19 is an illustration of a PSSCH signal with densified CSI-RS interlaces for a one or two port configuration.

FIG. 19 is an illustration 1900 of a PSSCH signal 1902 with densified CSI-RS interlaces for a one or two-port configuration. As discussed above, CSI-RS symbols 1904 are arranged in a contiguous manner for one comb and CSI-RS symbols 1906 are arranged in a contiguous manner for another non-adjacent, distributed comb. In this example, OCC is applied in the frequency domain.

Figure 20:
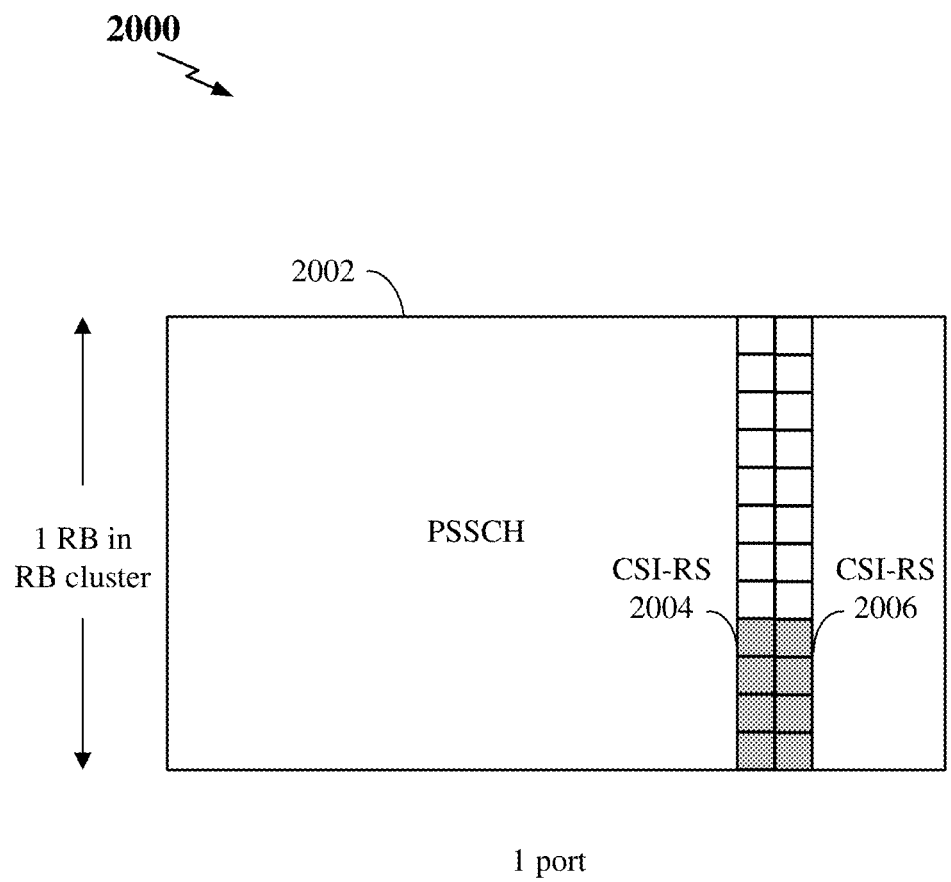
FIG. 20 is an illustration of a PSSCH signal with densified CSI-RS interlaces for a one-port configuration.
Figure 21:
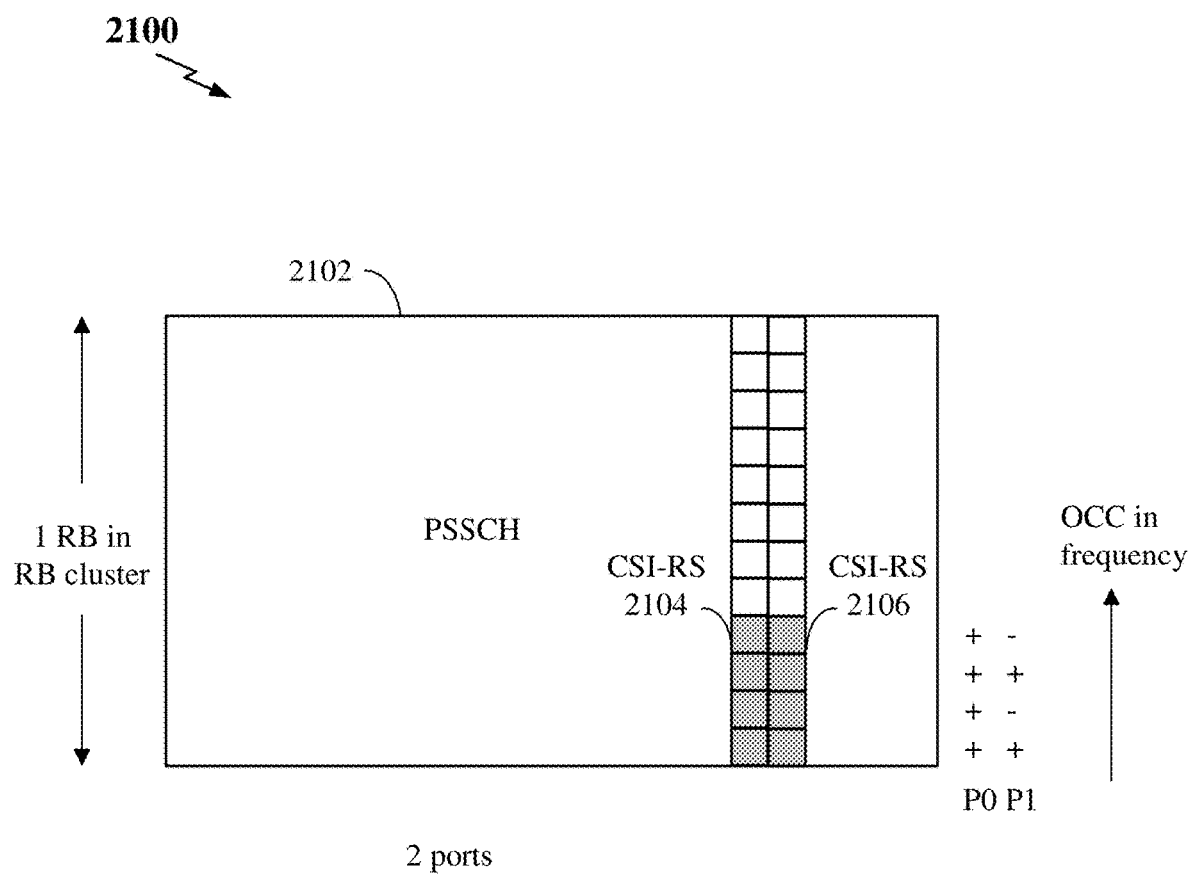
FIG. 21 is an illustration of a PSSCH signal with densified CSI-RS interlaces for a two-port configuration.
Figure 22:
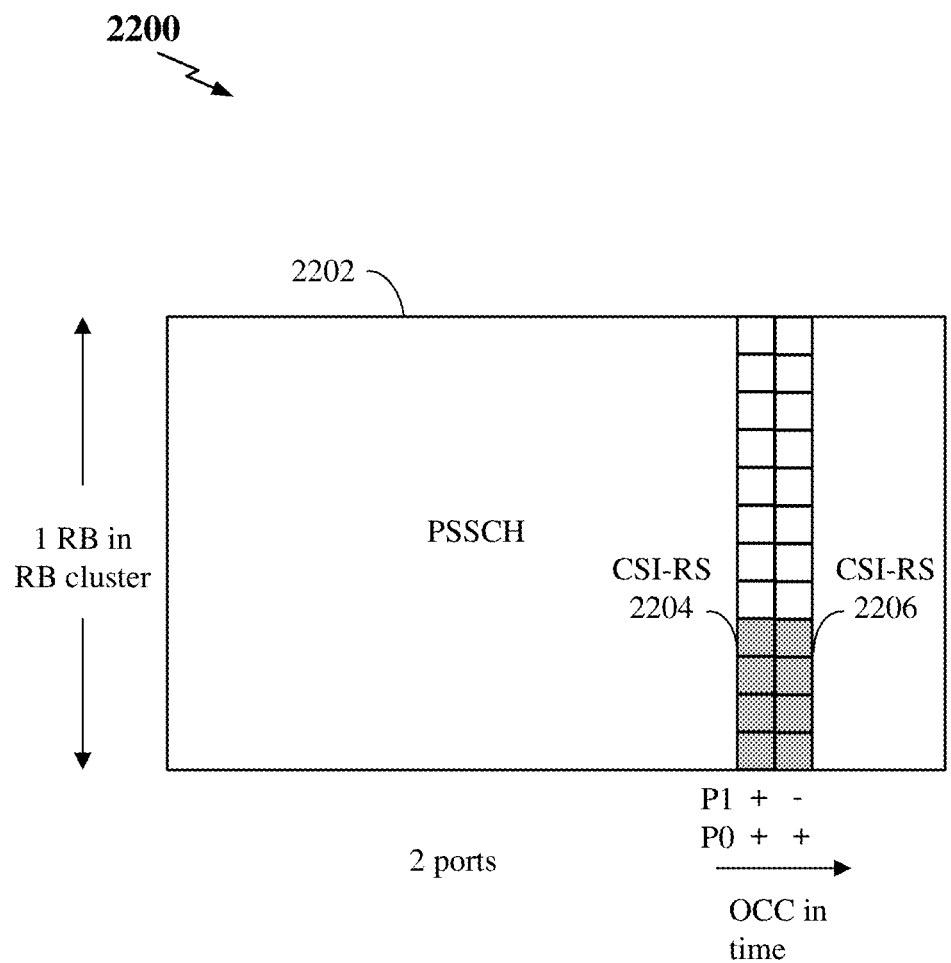
FIG. 22 is an illustration of another PSSCH signal with densified CSI-RS interlaces for a two-port configuration.

FIG. 20 is an illustration 2000 of a PSSCH signal 2002 with densified CSI-RS interlaces for a one port configuration. As discussed above, CSI-RS symbols 2004 are arranged in a contiguous manner for one comb and CSI-RS symbols 2006 are arranged in a contiguous manner for another comb that is adjacent. FIG. 21 is an illustration 2100 of a PSSCH signal 2102 with densified CSI-RS interlaces for a two-port configuration. Here, as in the example of FIG. 20, CSI-RS symbols 2104 are arranged in a contiguous manner for one comb, and CSI-RS symbols 2106 are arranged in a contiguous manner for another comb. However, instead of being distributed as in 2002, the two combs of PSSCH 2102 are configured to be adjacent. As before, in order to differentiate between two antennas for the ports, OCC is applied in the frequency domain as shown for ports P0 and P1. FIG. 22 is an illustration 2202 of another PSSCH signal with densified CSI-RS interlaces 2204, 2206 for a two-port configuration. In this example, CSI-RS 2204 and 2206 are similarly configured as CSI-RS 2104 and 2106 of FIG. 21, except that OCC is applied in the time domain as shown for ports P0 and P1.

In some examples, CSI-RS sequences may be based on pseudo-random sequences utilizing scrambling ID and slot indexes. In some examples, a Chu sequence (or "Zadoff-Chu (ZC) sequence") is used for uplink DMRS and SRS to reduce peak-to-average power ratios (PAPR) that may be advantageous for UE implementations. Using Chu sequences for CSI-RS sequences, long sequences may be formed across RB clusters for the entire interlace.

Figure 23:
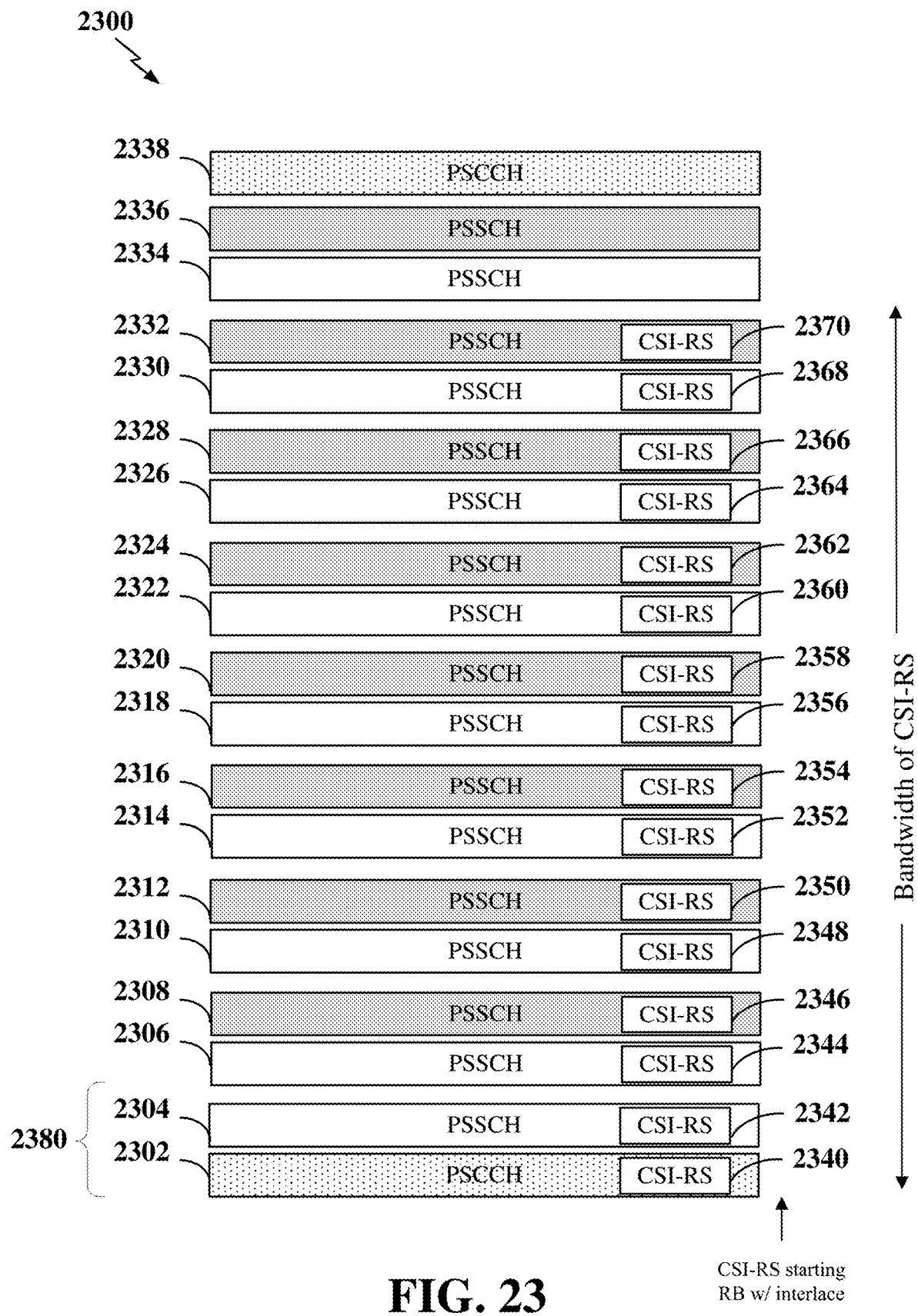
FIG. 23 is an illustration of a multiple-interlaced waveform for including CSI-RS in PSCCH and PSSCH resource blocks.

FIG. 23 is an illustration of a multiple-interlaced waveform 2300 for including CSI-RS in PSCCH and PSSCH resource blocks. The figure shows PSCCH signals 2302 and 2338 being configured on the edges of a plurality of PSSCH blocks 2304-2336 where, for example, two contiguous RBs 2302, 2304 may be considered a RB cluster 2380. For multiple interlace allocation, CSI-RS mapping may be configured such that CSI-RS occupies the resource blocks of all interlaces within the signaled bandwidth (2340-2370), as shown in the figure. In such configurations however, this may result in a large overhead.

Figure 24:
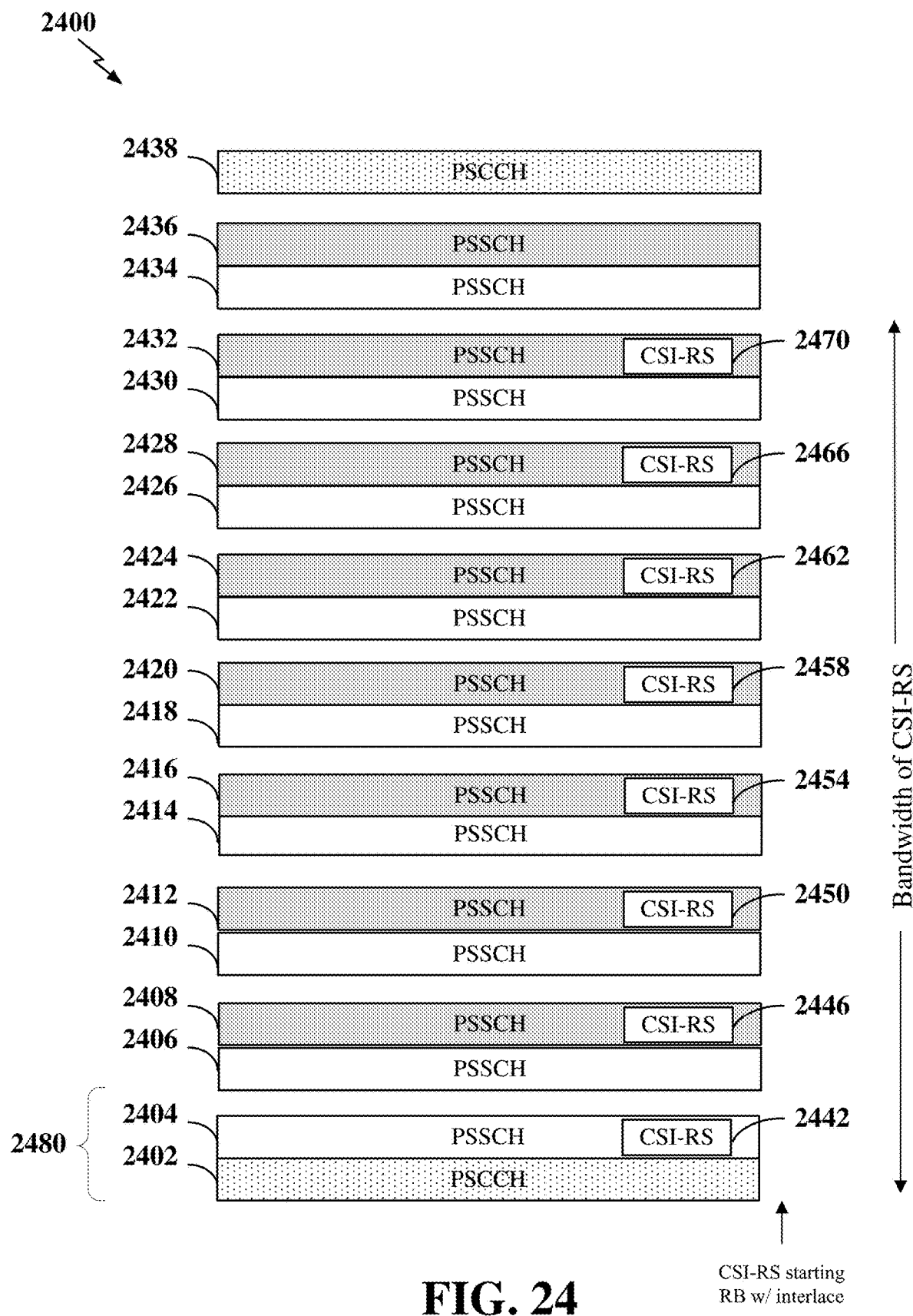
FIG. 24 is another illustration of a multiple-interlaced waveform for including CSI-RS in PSCCH and PSSCH resource blocks

FIG. 24 is another illustration of a multiple-interlaced waveform 2400 for including CSI-RS in PSCCH and PSSCH resource blocks. The figure shows PSCCH signals 2402 and 2238 being configured on the edges of a plurality of PSSCH blocks 2404-2336 where, for example, two contiguous RBs 2402, 2304 may be considered a RB cluster 2480. For multiple interlace allocation, CSI-RS mapping in this example may be configured such that CSI-RS occupies the first resource block (2442-2470) in each RB cluster. In some examples, the CSI-RS may be configured to occupy every other resource block in each RB cluster. In cases using contiguous interlace, a high frequency of correlation to adjacent resource blocks within each RB cluster may be achieved. In some examples, CSI-RS may be populated with lower density to reduce overhead.

Figure 25:
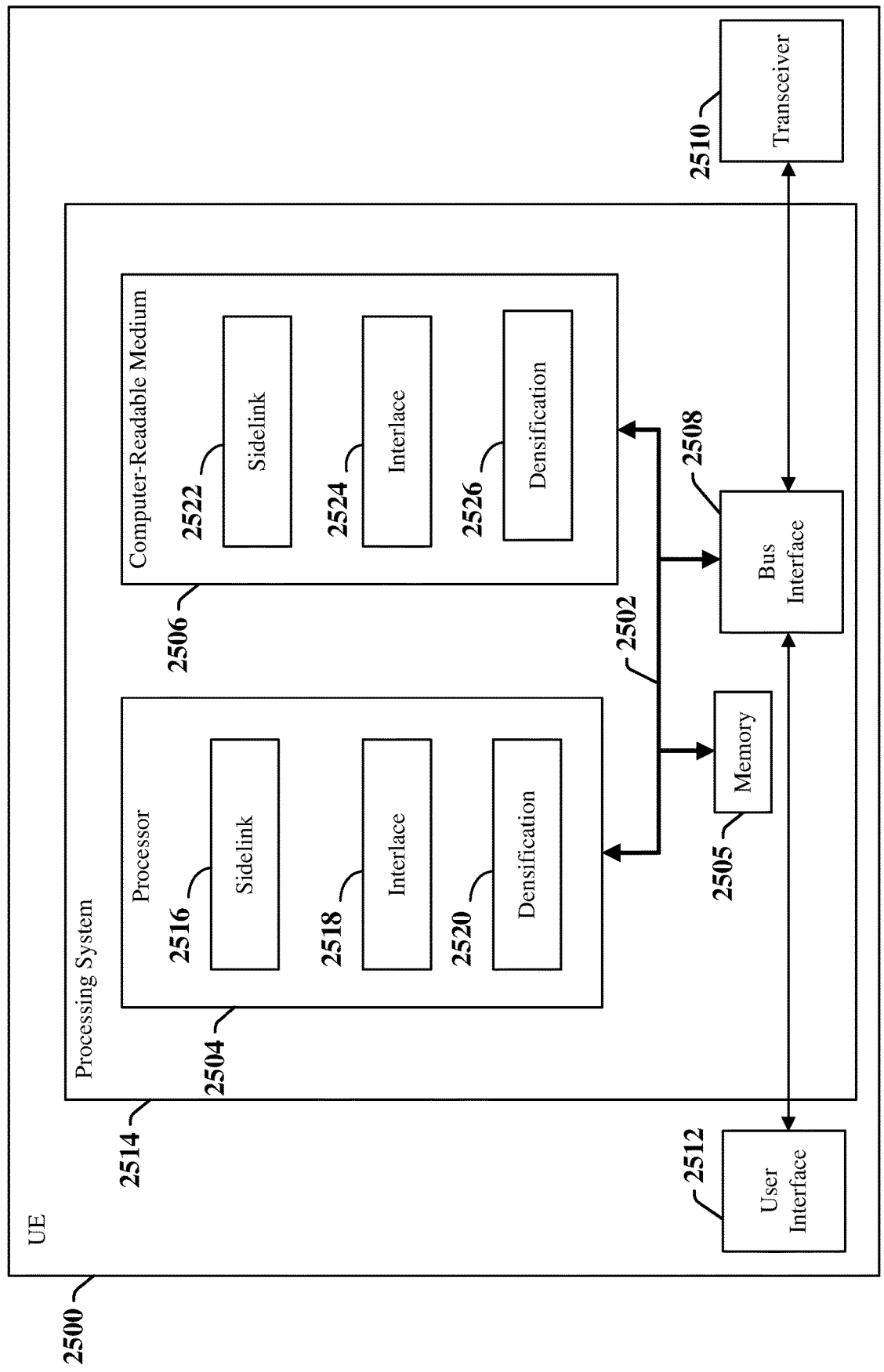
FIG. 25 is a block diagram illustrating an example of a hardware implementation for a UE employing a processing system in accordance with some aspects of the present disclosure.

FIG. 25 a block diagram illustrating an example of a hardware implementation for a UE 2500 employing a processing system 2514. For example, the UE 2500 may be a user equipment (UE) as illustrated in any one or more of FIGS. 1 and/or 2.

The UE 2500 may be implemented with a processing system 2514 (or "processing apparatus") that includes one or more processors 2504. Examples of processors 2504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 2500 may be configured to perform any one or more of the functions described herein, including, but not limited to, sidelink communication and processing. That is, the processor 2504, as utilized in the UE 2500, may be used to implement any one or more of the processes and procedures described herein.

In this example, the processing system 2514 may be implemented with a bus architecture, represented generally by the bus 2502. The bus 2502 may include any number of interconnecting buses and bridges depending on the specific application of the processing system 2514 and the overall design constraints. The bus 2502 communicatively couples together various circuits including one or more processors (represented generally by the processor 2504), a memory 2505, and computer-readable media (represented generally by the computer-readable medium 2506). The bus 2502 may also link various other circuits such as timing sources, peripherals, voltage regulators, and power management circuits, which are well known in the art, and therefore, will not be described any further. A bus interface 2508 provides an interface between the bus 2502 and a transceiver 2510. The transceiver 2510 provides a communication interface or means for communicating with various other apparatus over a transmission medium. Depending upon the nature of the apparatus, a user interface 2512 (e.g., keypad, display, speaker, microphone, joystick) may also be provided. Of course, such a user interface 2512 is optional, and may be omitted in some examples, such as a base station.

In some aspects of the disclosure, the processor 2504 may include sidelink processing circuitry 2516 configured to implement, for example, communication and sidelink processing described herein, such as technologies and techniques described in FIGS. 4-8 above. Interlace circuitry 2518 may be configured, for example, to implement signal interlacing, such as those described herein, and techniques described in FIGS. 9-24 above. Densification circuitry 2520 may be configured, for example, to implement signal (CSI-RS) densification, such as those described herein, and techniques described in FIGS. 10-24 above. In some examples, circuitry 2516-2520 may be combined as one or more circuits. The processor 2504 is responsible for managing the bus 2502 and general processing, including the execution of software stored on the computer-readable medium 2506. The software, when executed by the processor 2504, causes the processing system 2514 to perform the various functions described below for any particular apparatus. The computer-readable medium 2506 and the memory 2505 may also be used for storing data that is manipulated by the processor 2504 when executing software.

One or more processors 2504 in the processing system 2514 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 2506. The computer-readable medium 2506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2506 may reside in the processing system 2514, external to the processing system 2514, or distributed across multiple entities including the processing system 2514. The computer-readable medium 2506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 2506 may include sidelink instructions 2522 configured for various functions, including, but not limited to, sidelink processing associated with functions of sidelink processor 2516. The computer-readable storage medium 2506 may also include interlace instructions 2524 configured for various functions, including, but not limited to, time resource allocation associated with the functions of interlace circuitry 2518. The computer-readable storage medium 2506 may also include densification instructions 2526 configured for various functions, including, but not limited to, densification functions associated with collision densification circuitry 2520.

Of course, in the above examples, the circuitry included in the processor 2514 is merely provided as an example, and other means for carrying out the described functions may be included within various aspects of the present disclosure, including but not limited to the instructions stored in the computer-readable storage medium 2506, or any other suitable apparatus or means described in any one of the FIGS. 1-3, and utilizing, for example, the processes and/or algorithms described herein.

Figure 26:
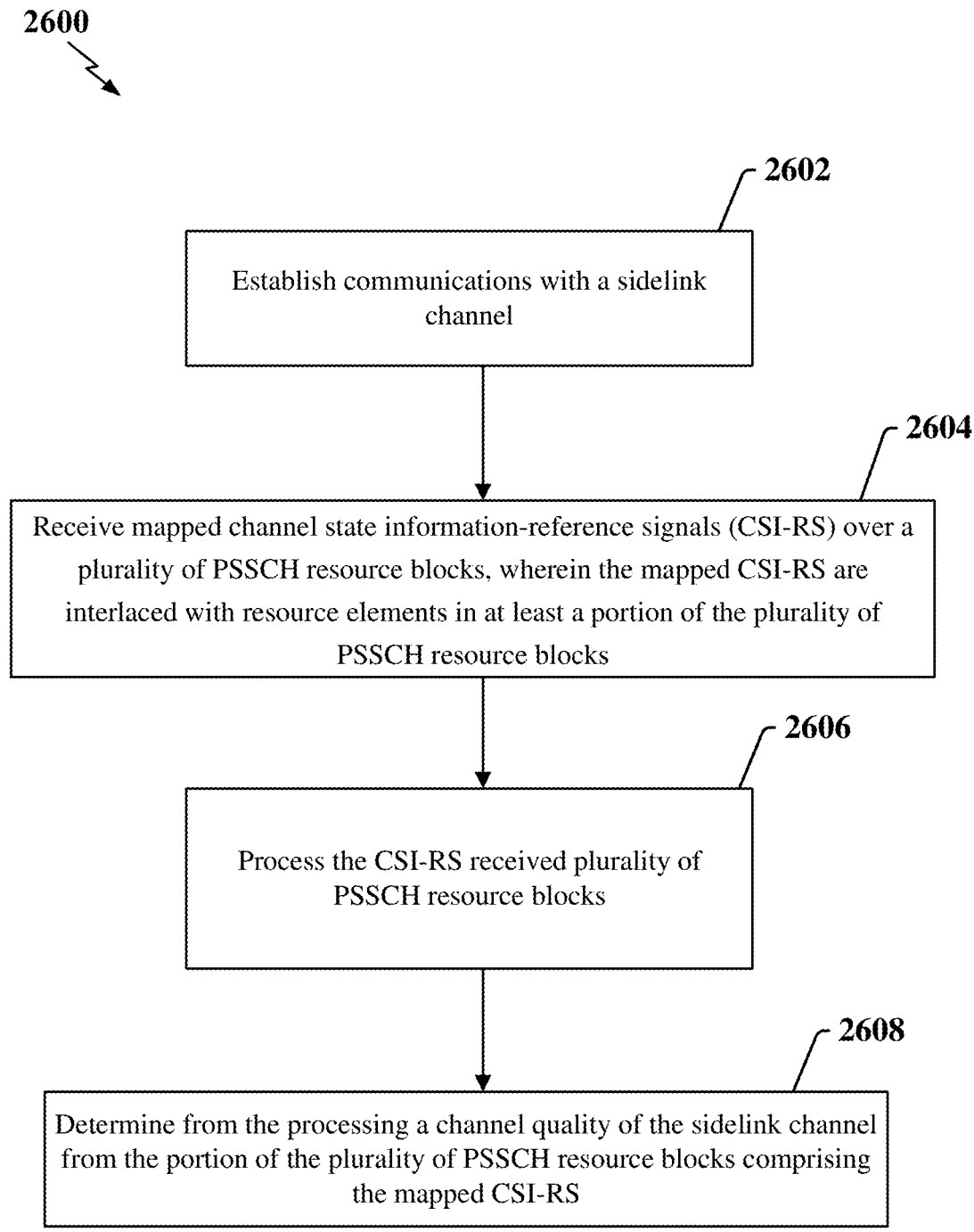
FIG. 26 is a process flow diagram for receiving and processing PSSCH blocks including interlaced CSI-RS resource elements.

FIG. 26 is a process flow diagram 2600 for receiving and processing PSSCH blocks including interlaced CSI-RS resource elements. In this example, a UE (e.g., 2500) may establish (e.g., via 2510) communication over a sidelink channel in block 2602. In block 2604, the UE may receive mapped channel state information-reference signals (CSI-RS) over a plurality of PSSCH resource blocks, wherein the mapped CSI-RS are interlaced with resource elements in at least a portion of the plurality of PSSCH resource blocks. In block 2606, the UE may process the CSI-RS received over the plurality of PSSCH blocks, and, in block 2608 determine from the processing a channel quality of the sidelink channel from the portion of the plurality of PSSCH resource blocks comprising the mapped CSI-RS.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-26 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-26 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communication at a user equipment (UE), comprising:
    establishing communication over a sidelink channel;
    receiving mapped channel state information-reference signals (CSI-RS) over a plurality of physical sidelink shared channel (PSSCH) resource blocks, wherein the mapped CSI-RS are interlaced with resource elements in at least a portion of the plurality of PSSCH resource blocks;
    processing the mapped CSI-RS received over the plurality of PSSCH resource blocks;
    determining from the processing a channel quality of the sidelink channel from the portion of the plurality of PSSCH resource blocks comprising the mapped CSI-RS; and
    configuring one or more sidelink communication parameters based on the determined channel quality.

2. The method of claim 1, wherein the mapped CSI-RS is interlaced with the resource elements via one of a comb-6, comb-4, comb-3, comb-2 or comb-1 structure.

3. The method of claim 1, wherein processing the CSI-RS received over the plurality of PSSCH resource blocks comprises code division multiplexing (CDM) in two contiguous combs.

4. The method of claim 1, wherein processing the CSI-RS received over the plurality of PSSCH resource blocks comprises applying orthogonal cover code (OCC) in at least one of a frequency domain and/or a time domain.

5. The method of claim 1, wherein the mapped CSI-RS are mapped over one or two ports.

6. The method of claim 1, wherein the mapped CSI-RS are mapped to adjacent symbols in the interlaced resource elements in at least some of the plurality of PSSCH resource blocks.

7. The method of claim 1, wherein the mapped CSI-RS are mapped to distributed symbols in the interlaced resource elements in at least some of the plurality of PSSCH resource blocks.

8. The method of claim 1, wherein the mapped CSI-RS are mapped to contiguous symbols in the interlaced resource elements in at least some of the plurality of PSSCH resource blocks.

9. A user equipment (UE) for wireless communication, comprising:
    a transceiver;
    at least one processor; and
    a memory coupled to the at least one processor, the at least one processor and the memory configured to:
        establish communication over a sidelink channel;
        receive mapped channel state information-reference signals (CSI-RS) over a plurality of physical sidelink shared channel (PSSCH) resource blocks, wherein the mapped CSI-RS are interlaced with resource elements in at least a portion of the plurality of PSSCH resource blocks;

process the mapped CSI-RS received over the plurality of PSSCH blocks;
determine from the processing a channel quality of the sidelink channel from the portion of the plurality of PSSCH resource blocks comprising the mapped CSI-RS; and
configure one or more sidelink communication parameters based on the determined channel quality.

10. The UE of claim 9, wherein the mapped CSI-RS is interlaced with the resource elements via one of a comb-6, comb-4, comb-3, comb-2 or comb-1 structure.

11. The UE of claim 9, wherein the at least one processor and the memory are configured to process the CSI-RS received over the plurality of PSSCH resource blocks using code division multiplexing (CDM) in two contiguous combs.

12. The UE of claim 9, wherein the at least one processor and the memory are configured to process the CSI-RS received over the plurality of PSSCH resource blocks by applying orthogonal cover code (OCC) in at least one of a frequency domain and/or a time domain.

13. The UE of claim 9, wherein the mapped CSI-RS are mapped over one or two ports.

14. The UE of claim 9, wherein the mapped CSI-RS are mapped to adjacent symbols in the interlaced resource elements in at least some of the plurality of PSSCH resource blocks.

15. The UE of claim 9, wherein the mapped CSI-RS are mapped to distributed symbols in the interlaced resource elements in at least some of the plurality of PSSCH resource blocks.

16. The UE of claim 9, wherein the mapped CSI-RS are mapped to contiguous symbols in the interlaced resource elements in at least some of the plurality of PSSCH resource blocks.

17. A non-transitory computer-readable medium storing computer-executable code at a user equipment (UE), comprising code for causing a computer to:
establish communication over a sidelink channel;
receive mapped channel state information-reference signals (CSI-RS) over a plurality of physical sidelink shared channel (PSSCH) resource blocks, wherein the mapped CSI-RS are interlaced with resource elements in at least a portion of the plurality of PSSCH resource blocks;
process the mapped CSI-RS received over the plurality of PSSCH blocks;
determine from the processing a channel quality of the sidelink channel from the portion of the plurality of PSSCH resource blocks comprising the mapped CSI-RS; and
configure one or more sidelink communication parameters based on the determined channel quality.

18. The non-transitory computer-readable medium of claim 17, wherein the mapped CSI-RS is interlaced with the resource elements via one of a comb-6, comb-4, comb-3, comb-2 or comb-1 structure.

19. The non-transitory computer-readable medium of claim 17, wherein processing the CSI-RS received over the plurality of PSSCH resource blocks comprises code division multiplexing (CDM) in two contiguous combs.

20. The non-transitory computer-readable medium of claim 17, wherein processing the CSI-RS received over the plurality of PSSCH resource blocks comprises applying orthogonal cover code (OCC) in at least one of a frequency domain and/or a time domain.

21. The non-transitory computer-readable medium of claim 17, wherein the mapped CSI-RS are mapped over one or two ports.

22. The non-transitory computer-readable medium of claim 17, wherein the mapped CSI-RS are mapped to adjacent symbols in the interlaced resource elements in at least some of the plurality of PSSCH resource blocks.

23. The non-transitory computer-readable medium of claim 17, wherein the mapped CSI-RS are mapped to distributed symbols in the interlaced resource elements in at least some of the plurality of PSSCH resource blocks.

24. The non-transitory computer-readable medium of claim 17, wherein the mapped CSI-RS are mapped to contiguous symbols in the interlaced resource elements in at least some of the plurality of PSSCH resource blocks.

25. A user equipment (UE) for wireless communication, comprising:
means for establishing communication over a sidelink channel;
means for receiving mapped channel state information-reference signals (CSI-RS) over a plurality of physical sidelink shared channel (PSSCH) resource blocks, wherein the mapped CSI-RS are interlaced with resource elements in at least a portion of the plurality of PSSCH resource blocks;
means for processing the mapped CSI-RS received over the plurality of PSSCH blocks;
means for determining from the processing a channel quality of the sidelink channel from the portion of the plurality of PSSCH resource blocks comprising the mapped CSI-RS; and
means for configuring one or more sidelink communication parameters based on the determined channel quality.

26. The UE of claim 25, wherein the mapped CSI-RS is interlaced with the resource elements via one of a comb-6, comb-4, comb-3, comb-2 or comb-1 structure.

27. The UE of claim 25, wherein the means for processing processes the CSI-RS received over the plurality of PSSCH resource blocks using code division multiplexing (CDM) in two contiguous combs.

28. The UE of claim 25, wherein the means for processing processes the CSI-RS received over the plurality of PSSCH resource blocks by applying orthogonal cover code (OCC) in at least one of a frequency domain and/or a time domain.

29. The UE of claim 25, wherein the mapped CSI-RS are mapped over one or two ports.

30. The UE of claim 25, wherein the mapped CSI-RS are mapped to adjacent symbols in the interlaced resource elements in at least some of the plurality of PSSCH resource blocks.

31. The UE of claim 25, wherein the mapped CSI-RS are mapped to distributed symbols in the interlaced resource elements in at least some of the plurality of PSSCH resource blocks.

32. The UE of claim 25, wherein the mapped CSI-RS are mapped to contiguous symbols in the interlaced resource elements in at least some of the plurality of PSSCH resource blocks.

* * * * *